United States Patent [19]
Winer

[11] Patent Number: 5,796,401
[45] Date of Patent: Aug. 18, 1998

[54] SYSTEM FOR DESIGNING DYNAMIC LAYOUTS ADAPTABLE TO VARIOUS DISPLAY SCREEN SIZES AND RESOLUTIONS

[76] Inventor: Peter W. Winer, 894 Parma Way, Los Altos, Calif. 94024

[21] Appl. No.: 694,992

[22] Filed: Aug. 9, 1996

[51] Int. Cl.$^6$ ........................................ G06F 15/00
[52] U.S. Cl. ........................................ 345/433
[58] Field of Search ........................ 345/433, 439, 345/428, 127

[56] References Cited

U.S. PATENT DOCUMENTS 5,485,561  1/1996  Iizuka et al. .................. 395/133

*Primary Examiner*—Phu K. Nguyen
*Attorney, Agent, or Firm*—William C. Milks, III

[57] ABSTRACT

An intelligent layout system for drawing objects and organizing the drawn objects. The layout system facilitates creation of objects, such as boxes that can contain text, graphics, outlines, titles, headlines, and other information and data, to provide a custom dashboard layout, as well as serves as a layout manager for organization of the objects. Additionally, the layout system enables objects to be manipulated individually or as a group and to be arranged permanently in various relationships, in which various components or attributes of the objects are interrelated. For example, the layout system enables a user to interrelate objects in one or more permanent relationships by selectively distributing, aligning, sizing, and/or spacing the objects. The layout system also provides a graphical user interface design tool for designing dynamic page layouts that automatically adapt to various page sizes and display screen sizes and resolutions. The layout system enables objects to be connected to the edge or edges of one or more pages in an intuitive and gestural manner to provide a dynamic page layout tool that automatically moves objects and causes them to re-size automatically to adapt the size and position of the objects if the page is re-sized or the size or resolution of the display screen is altered.

20 Claims, 20 Drawing Sheets

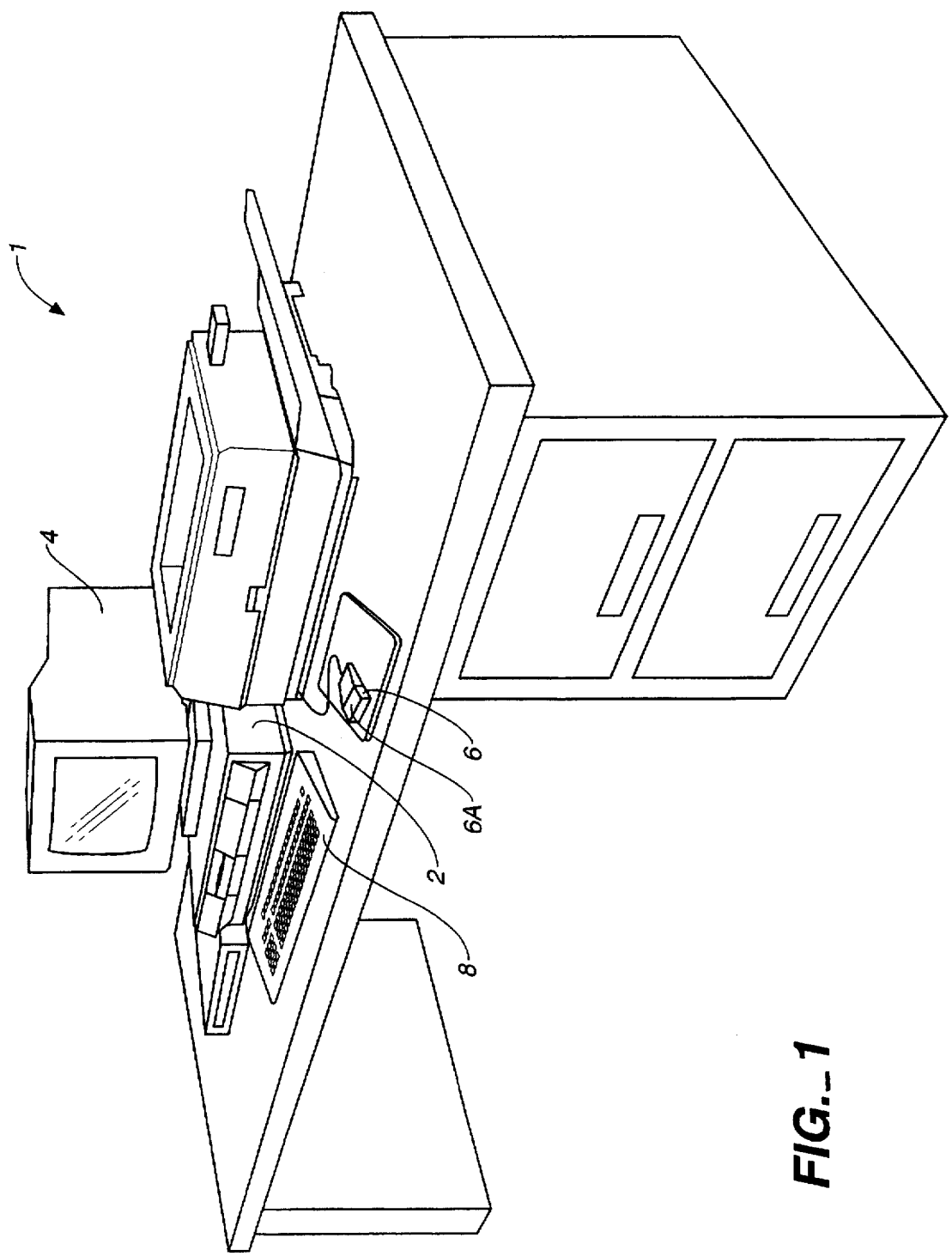
FIG._1

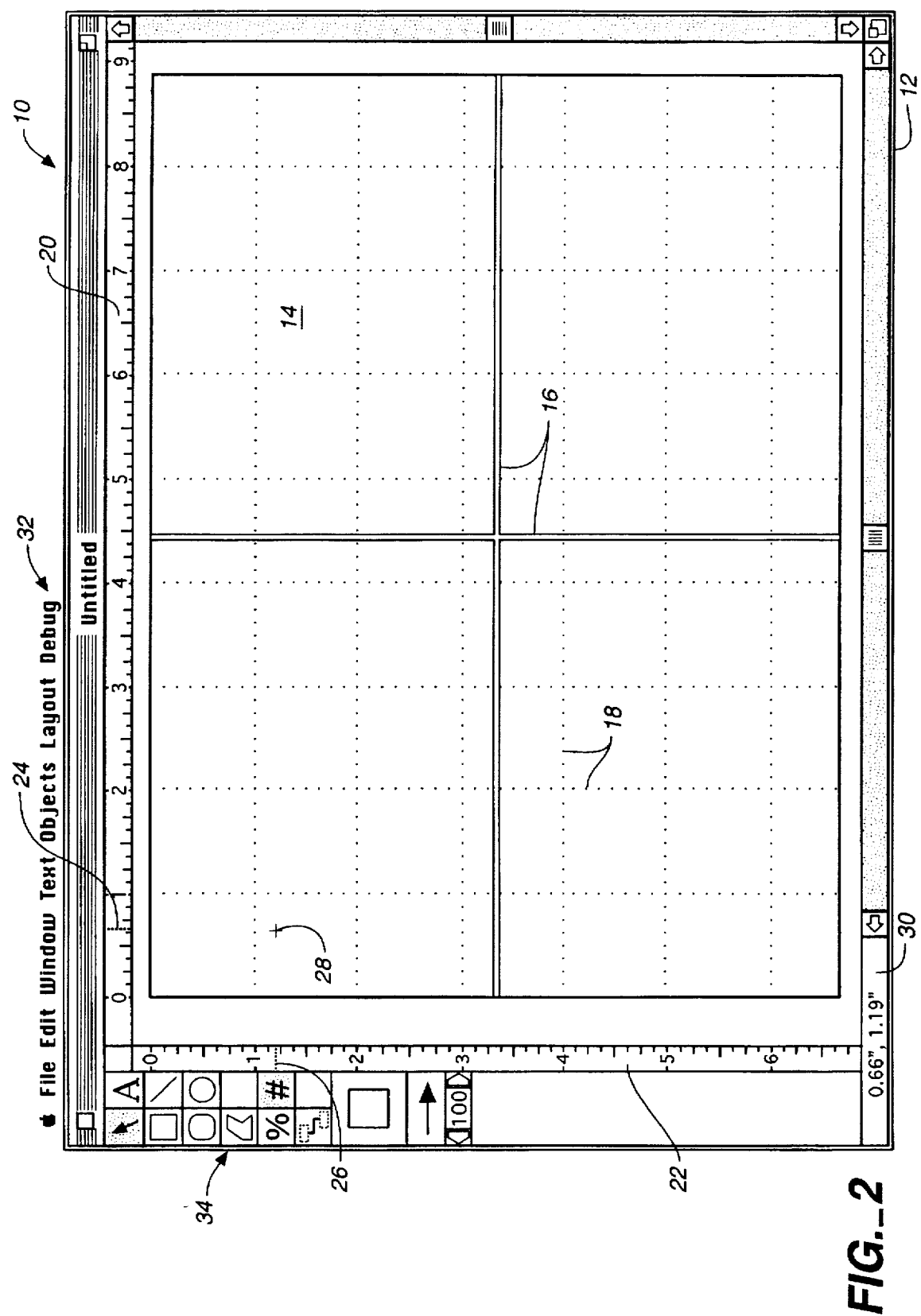
FIG._2

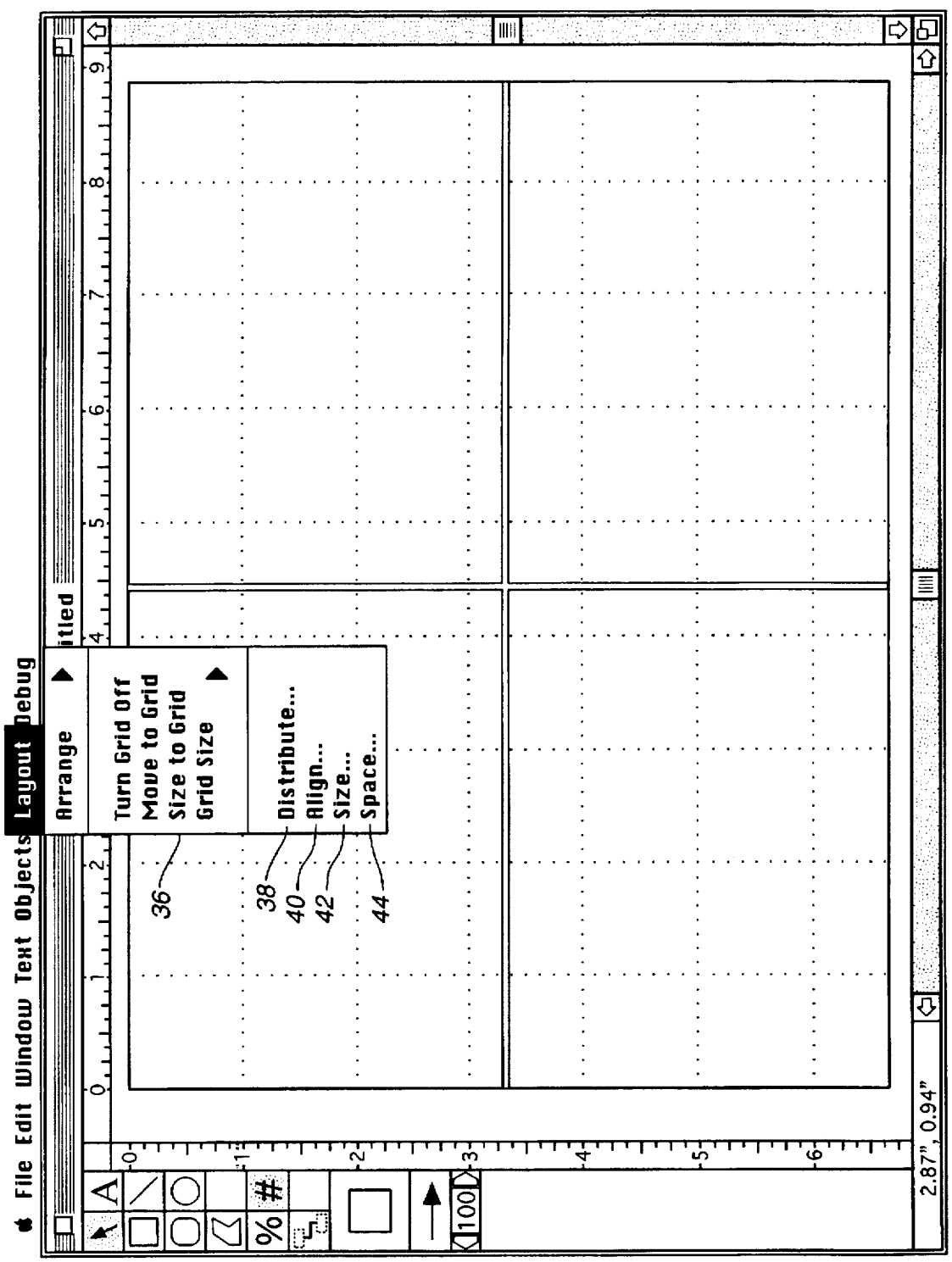
FIG._3

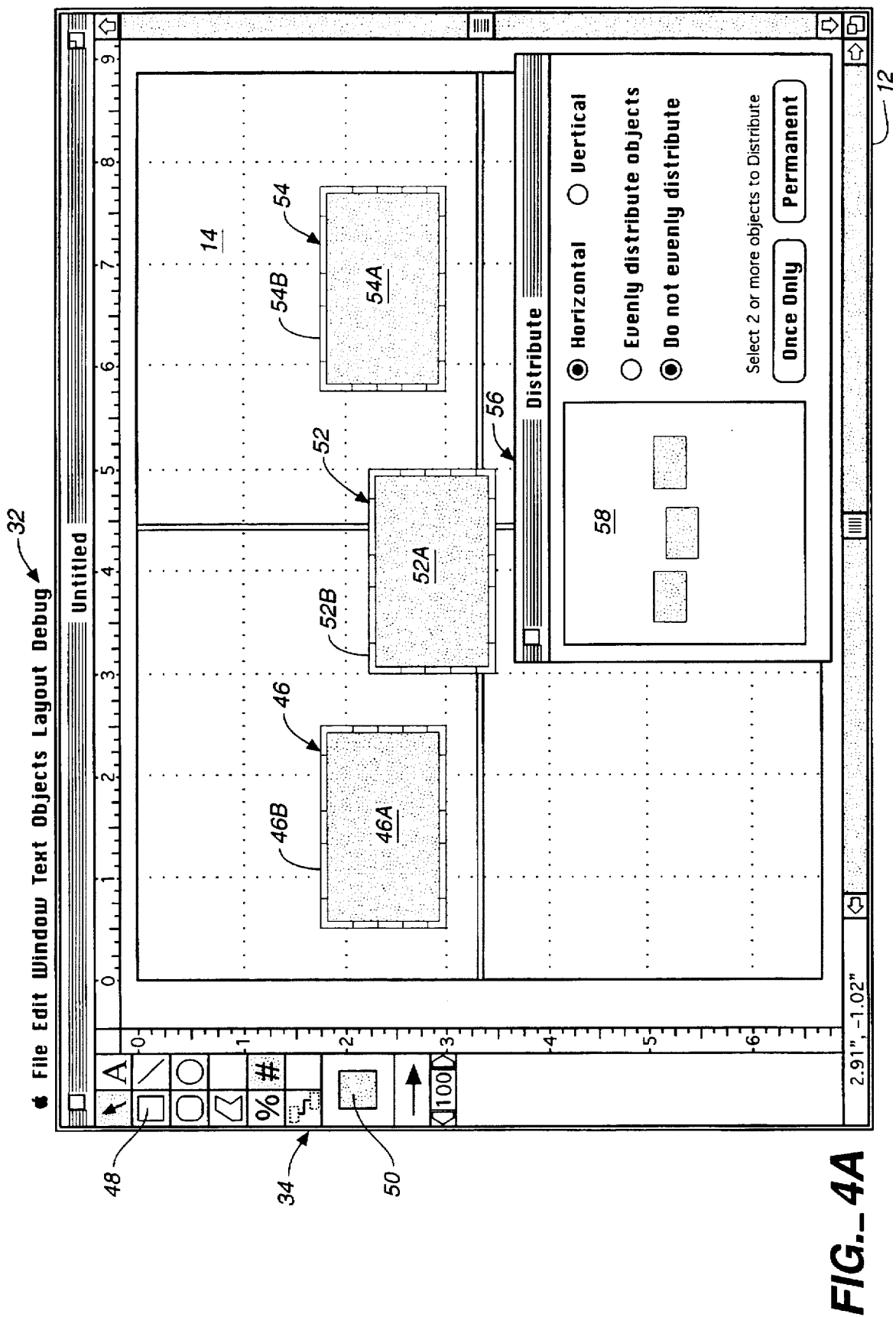
FIG._4A

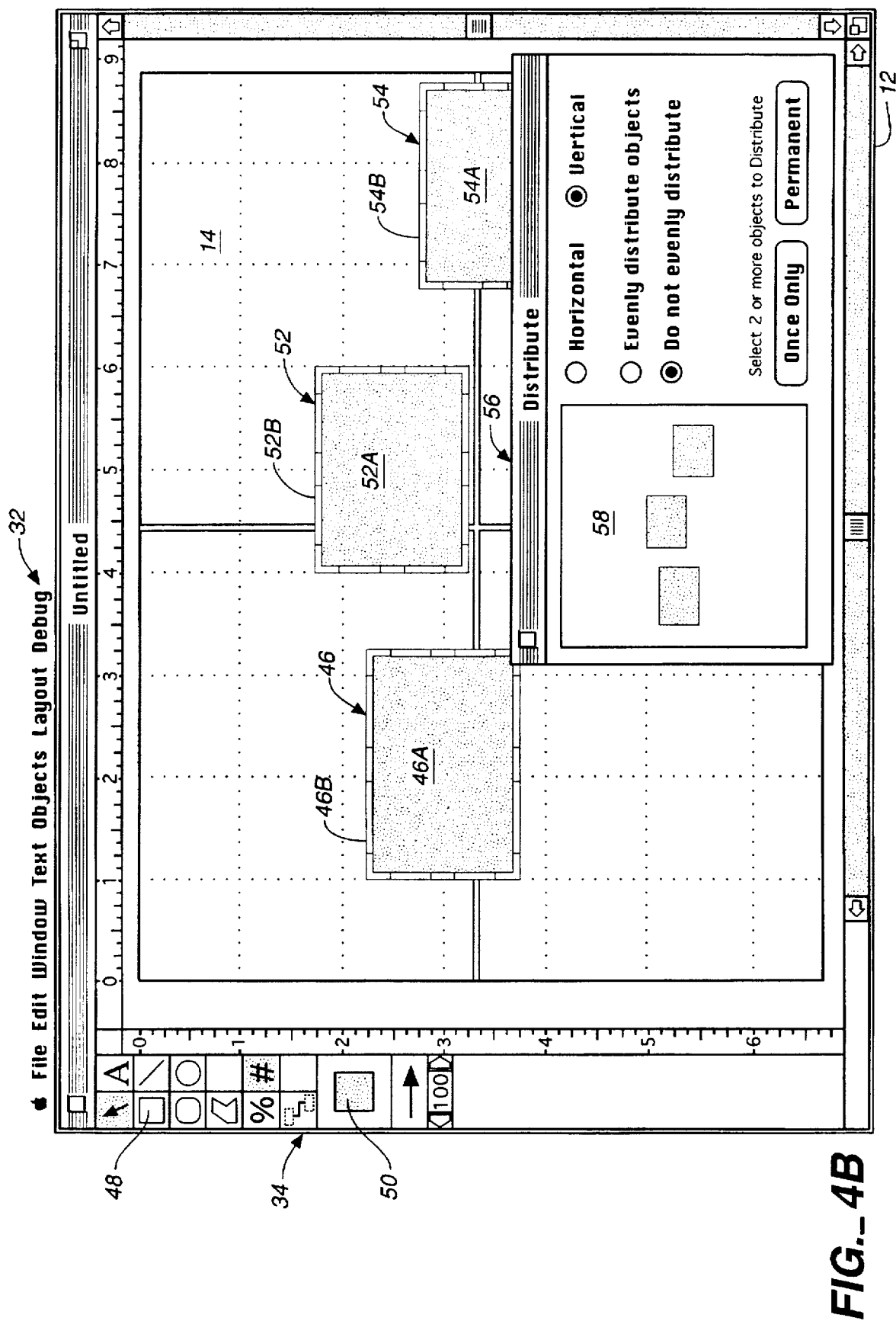
FIG._4B

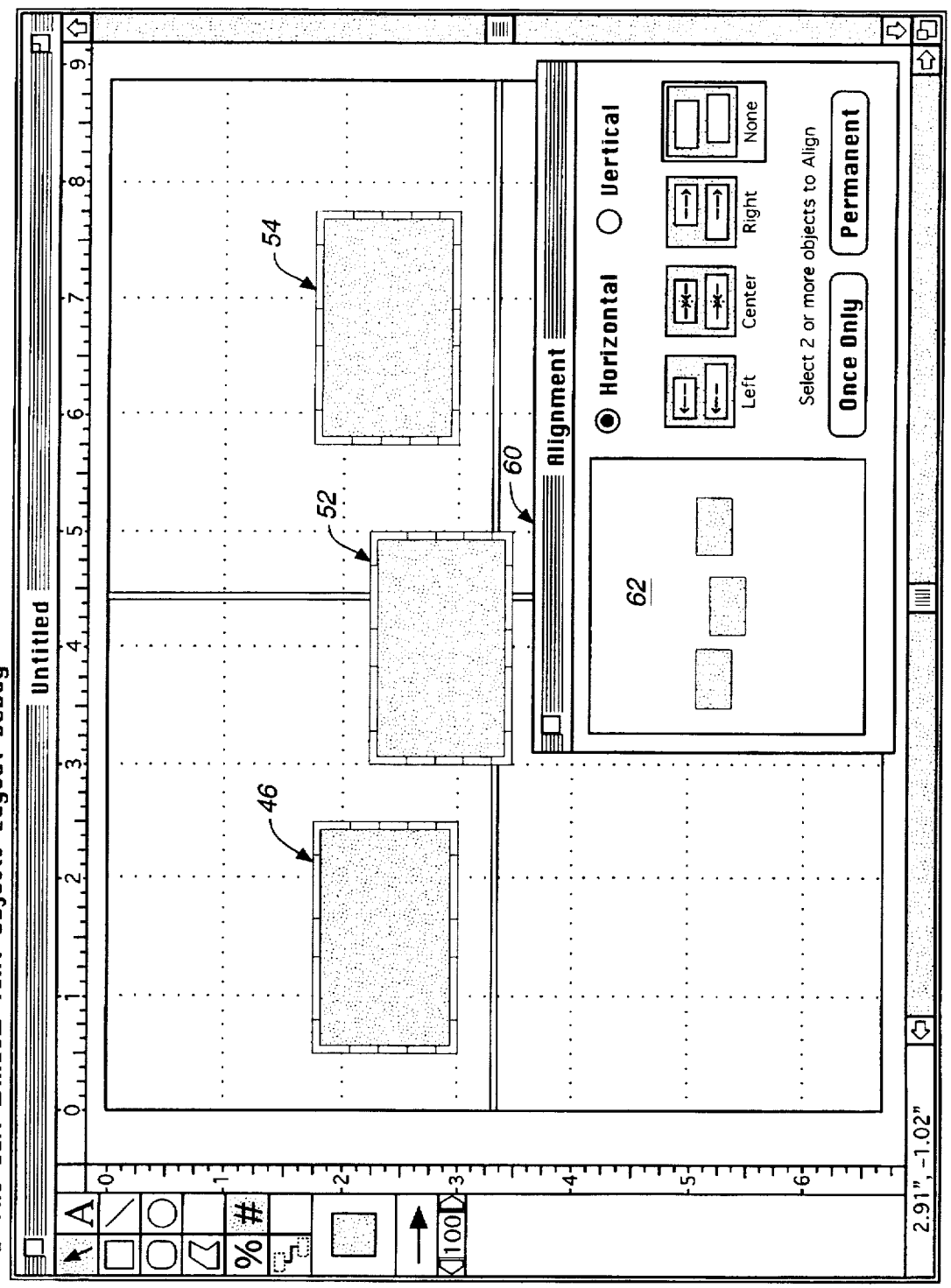
FIG._5A

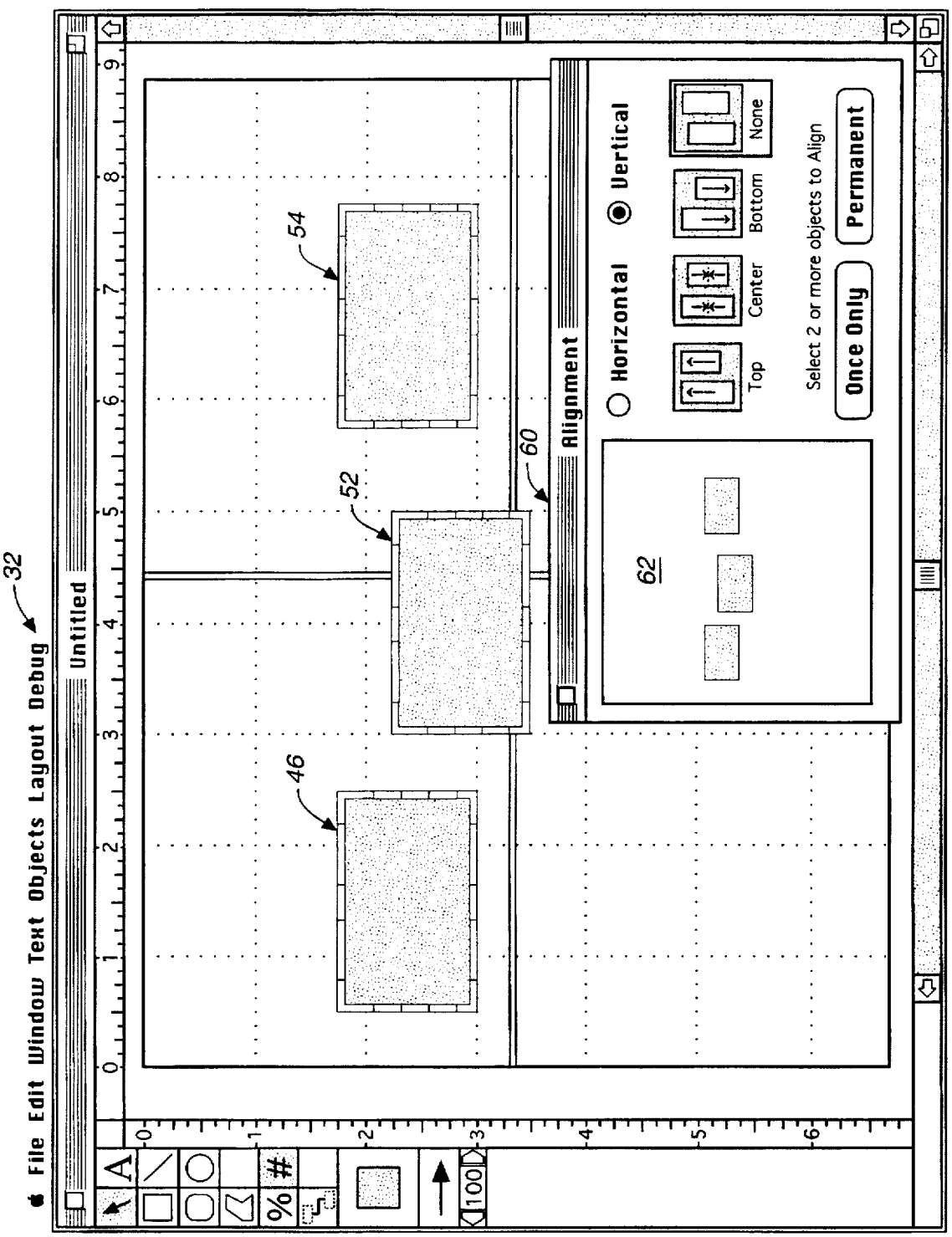
FIG._5B

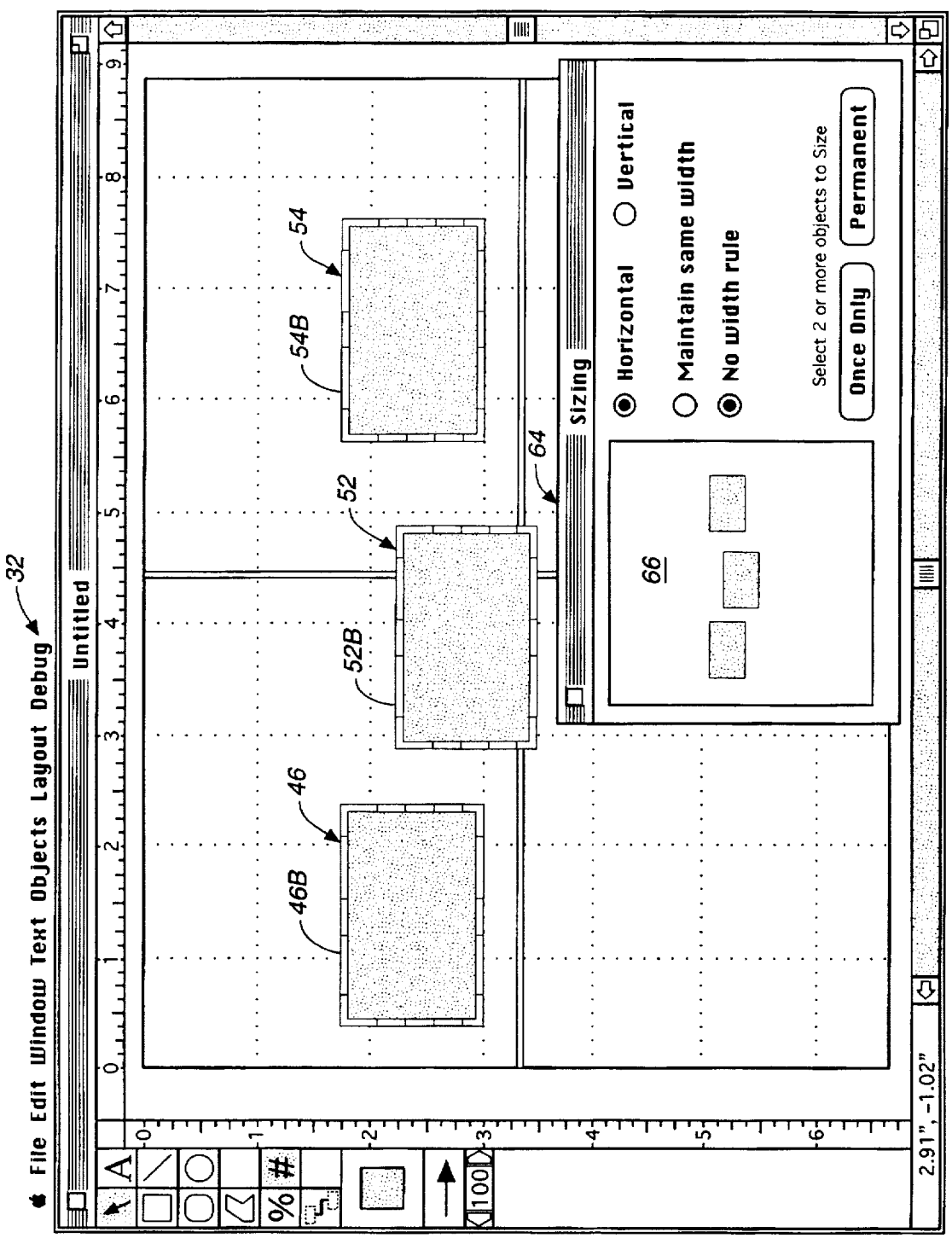
FIG._6A

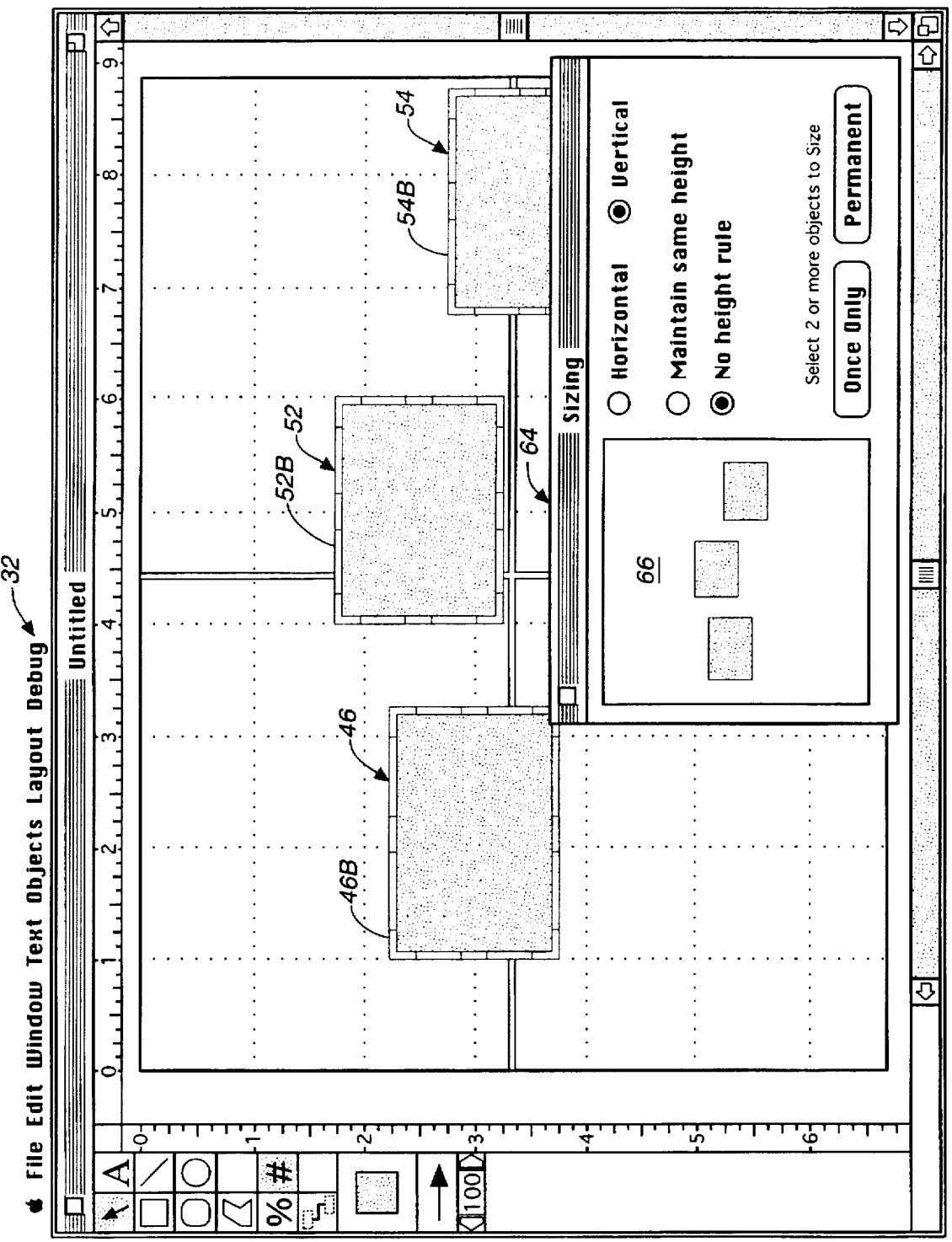
FIG._6B

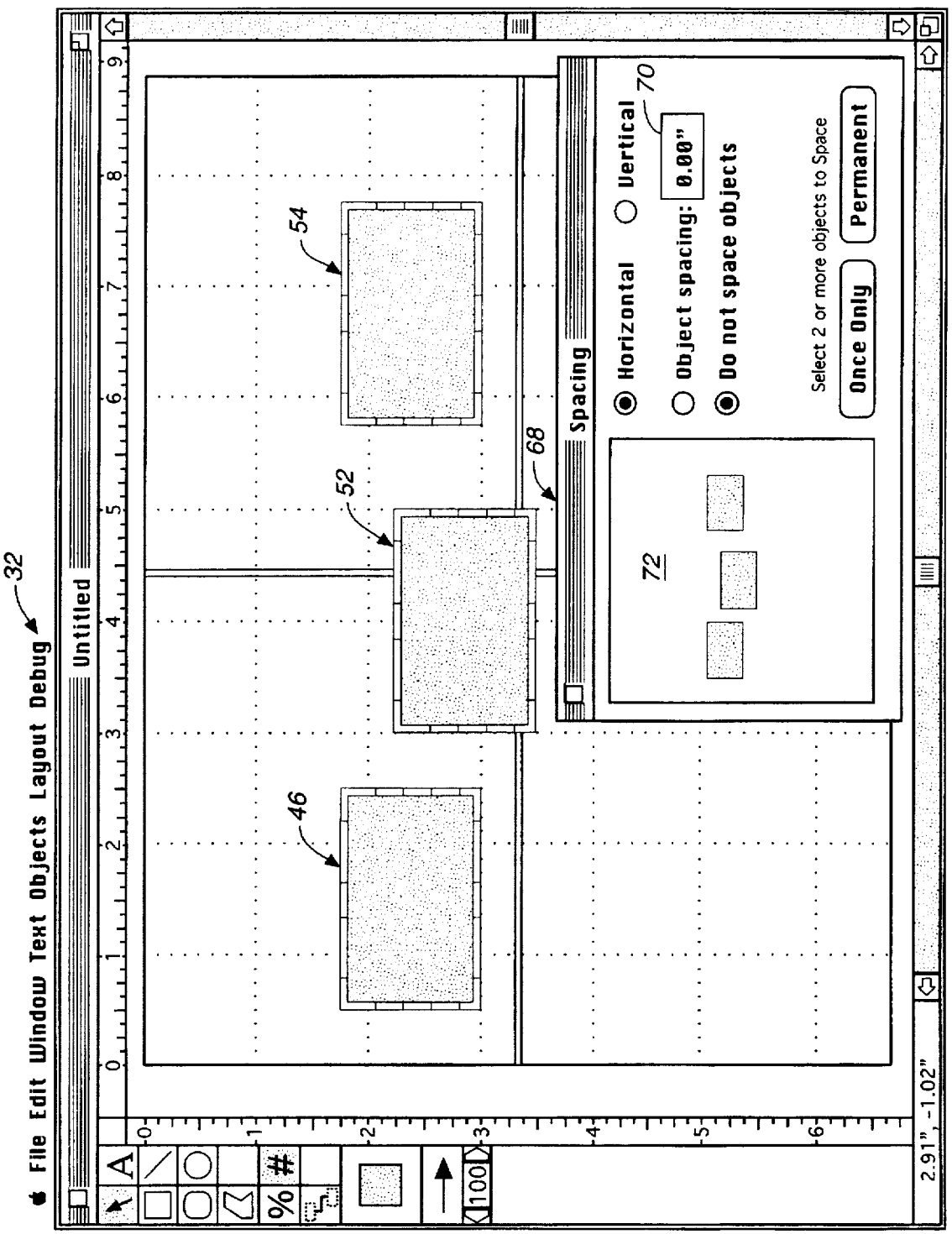
FIG._7A

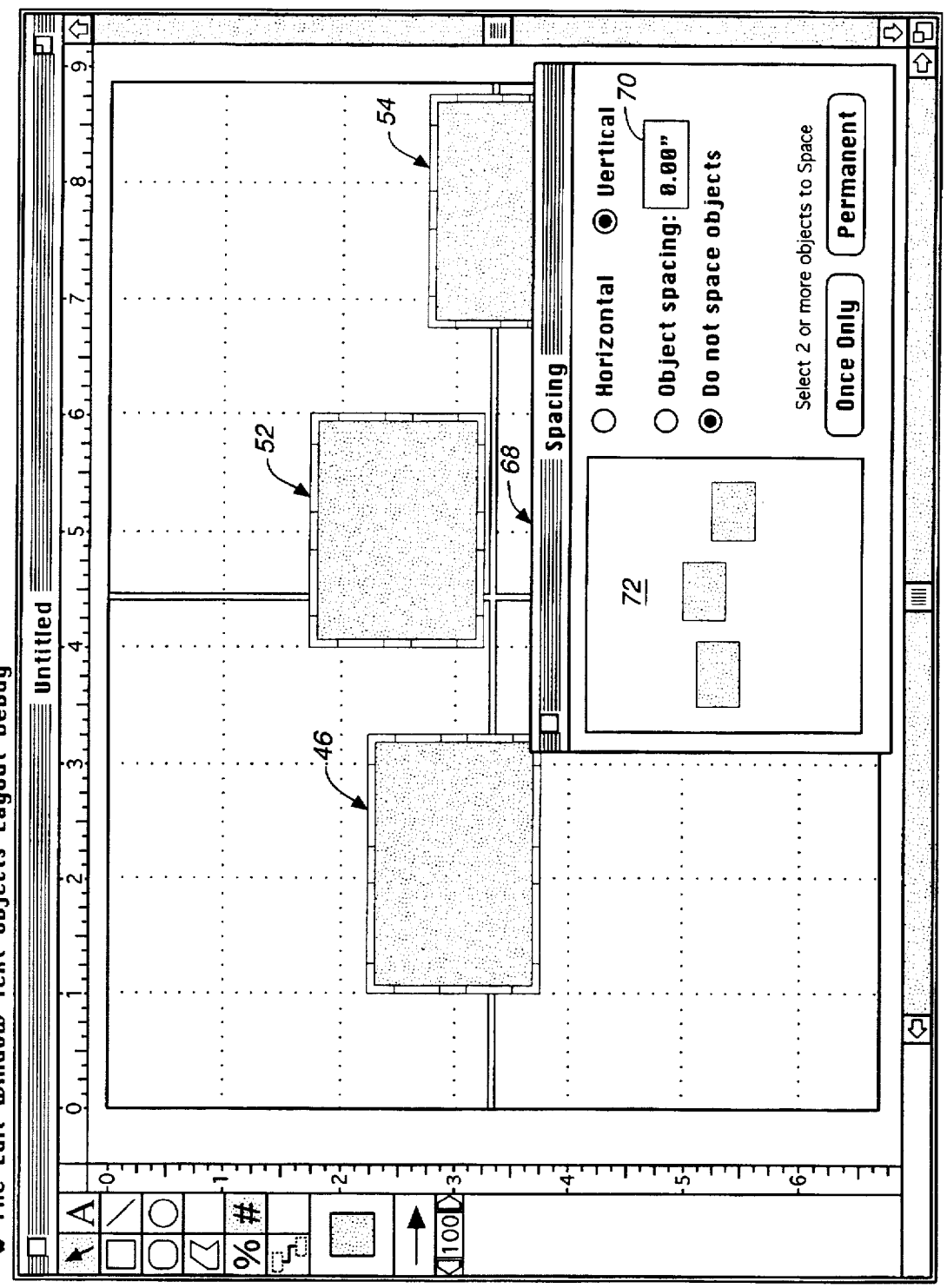
FIG. _ 7B

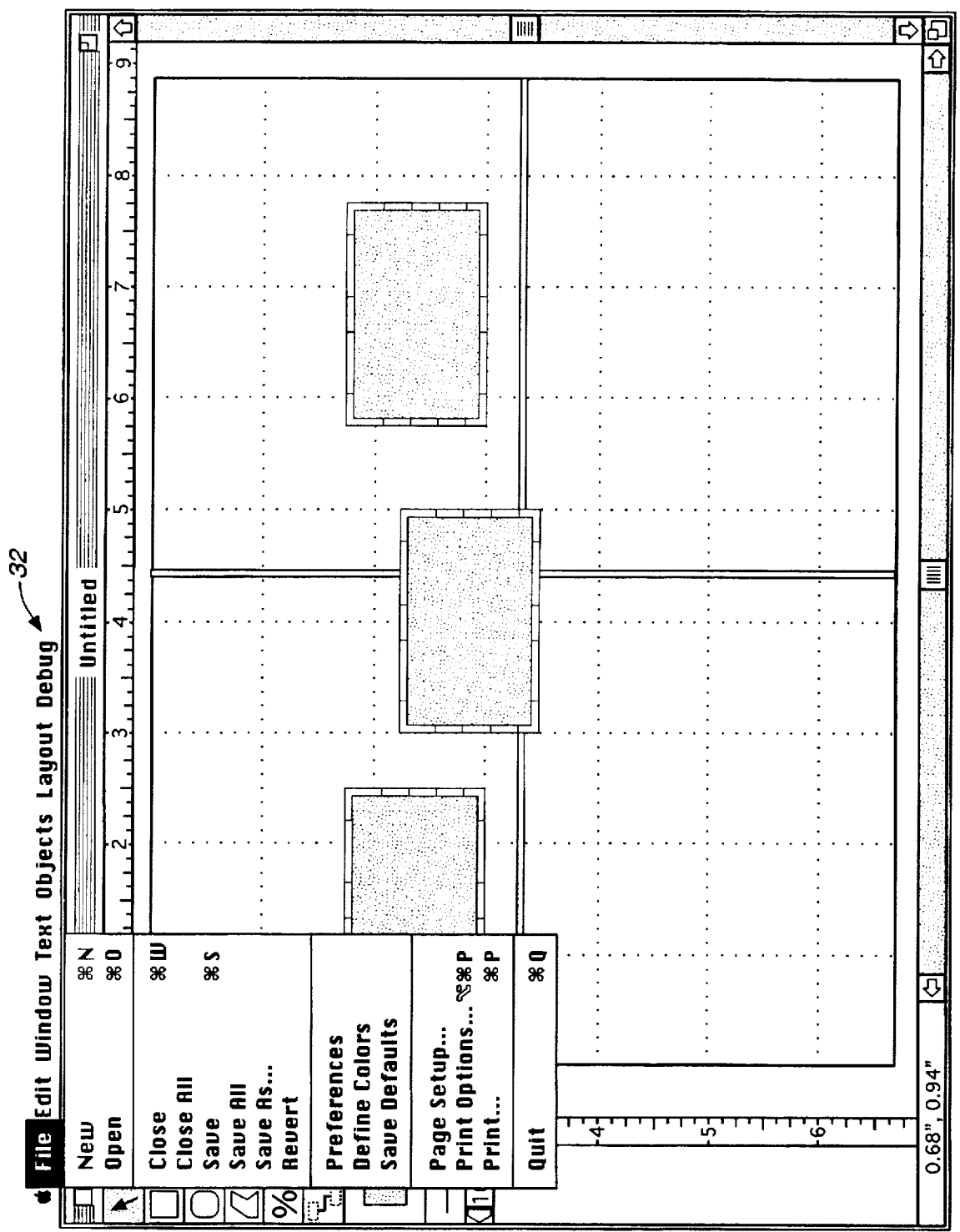
FIG._8

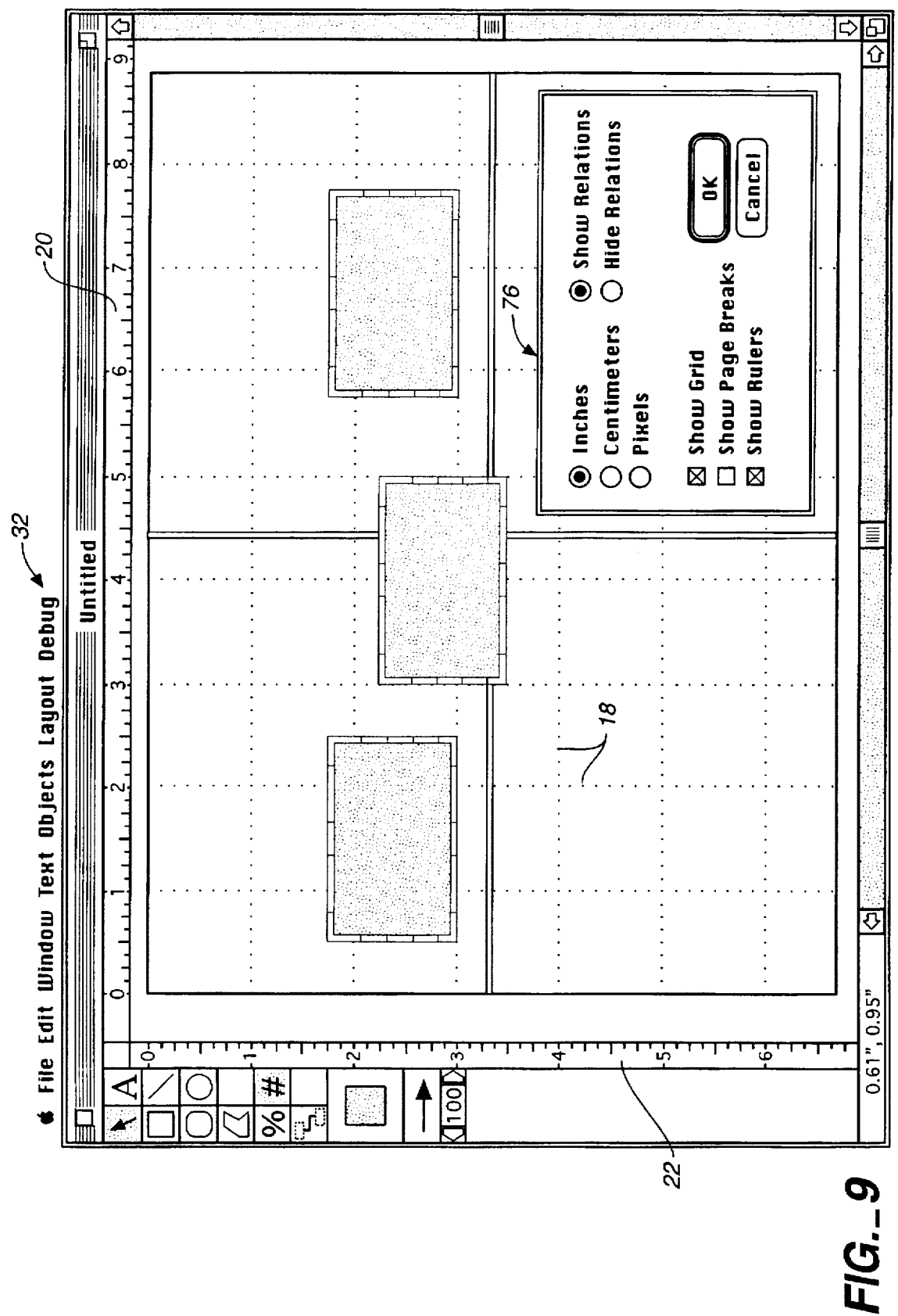
FIG._9

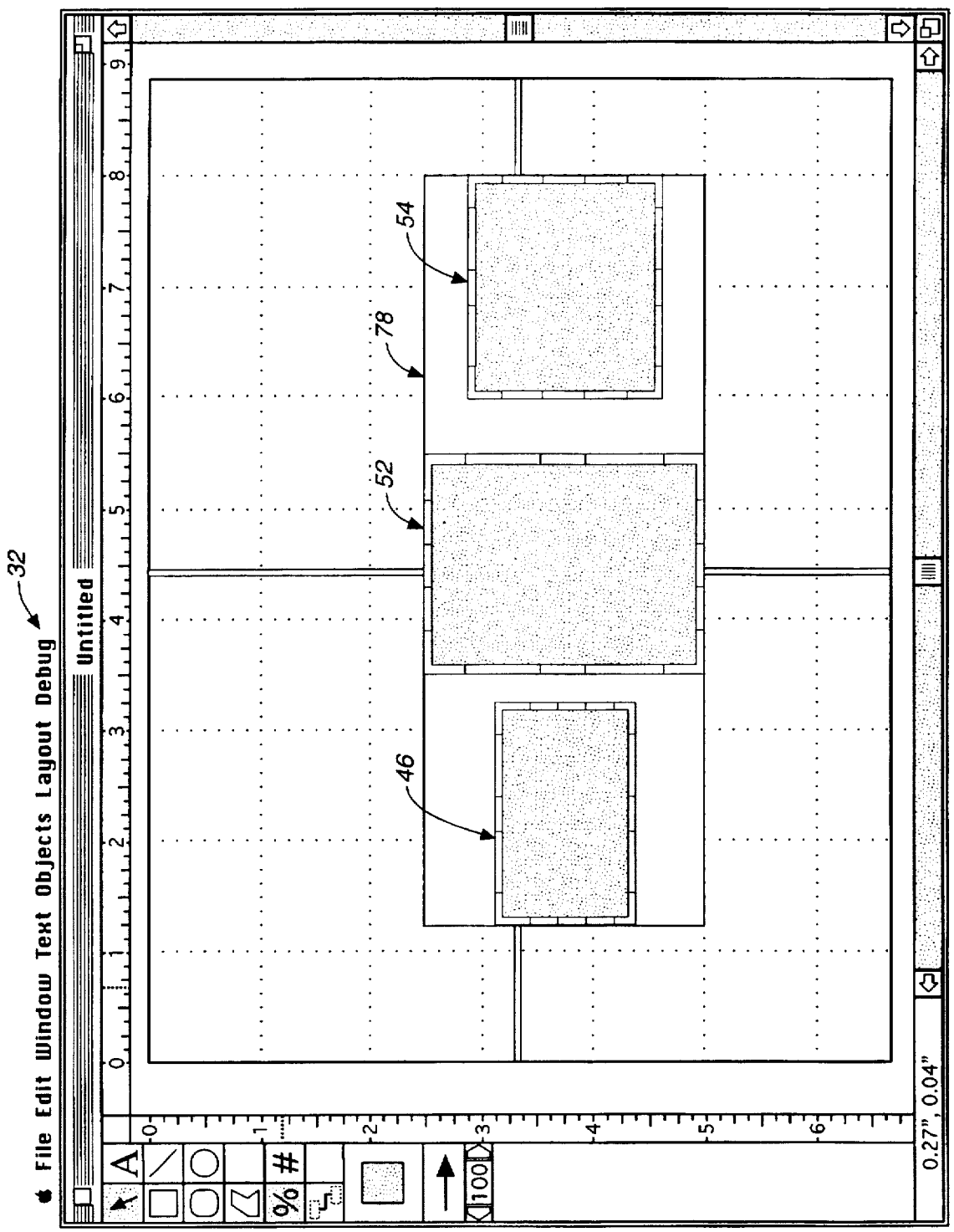
FIG._10

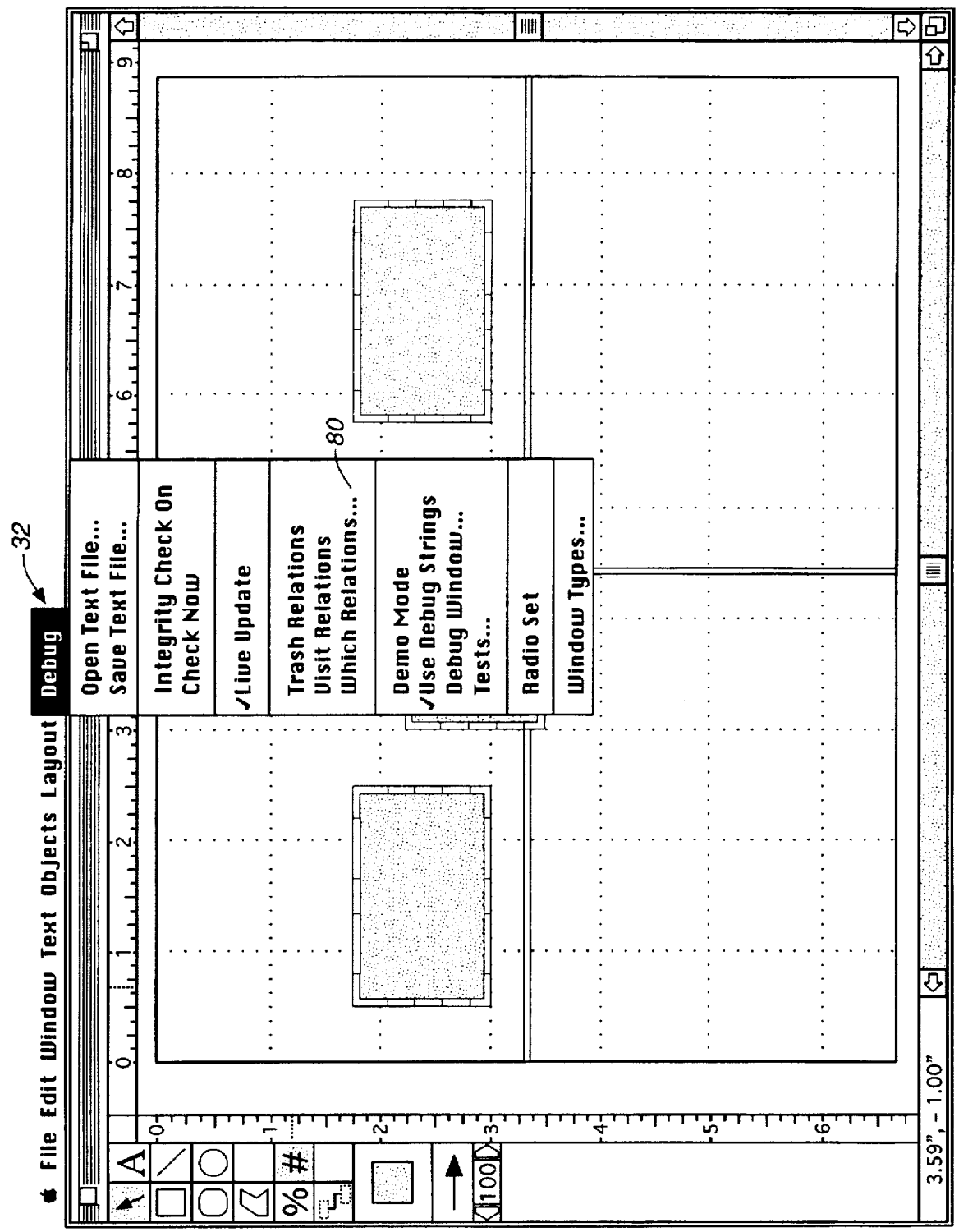
FIG._11

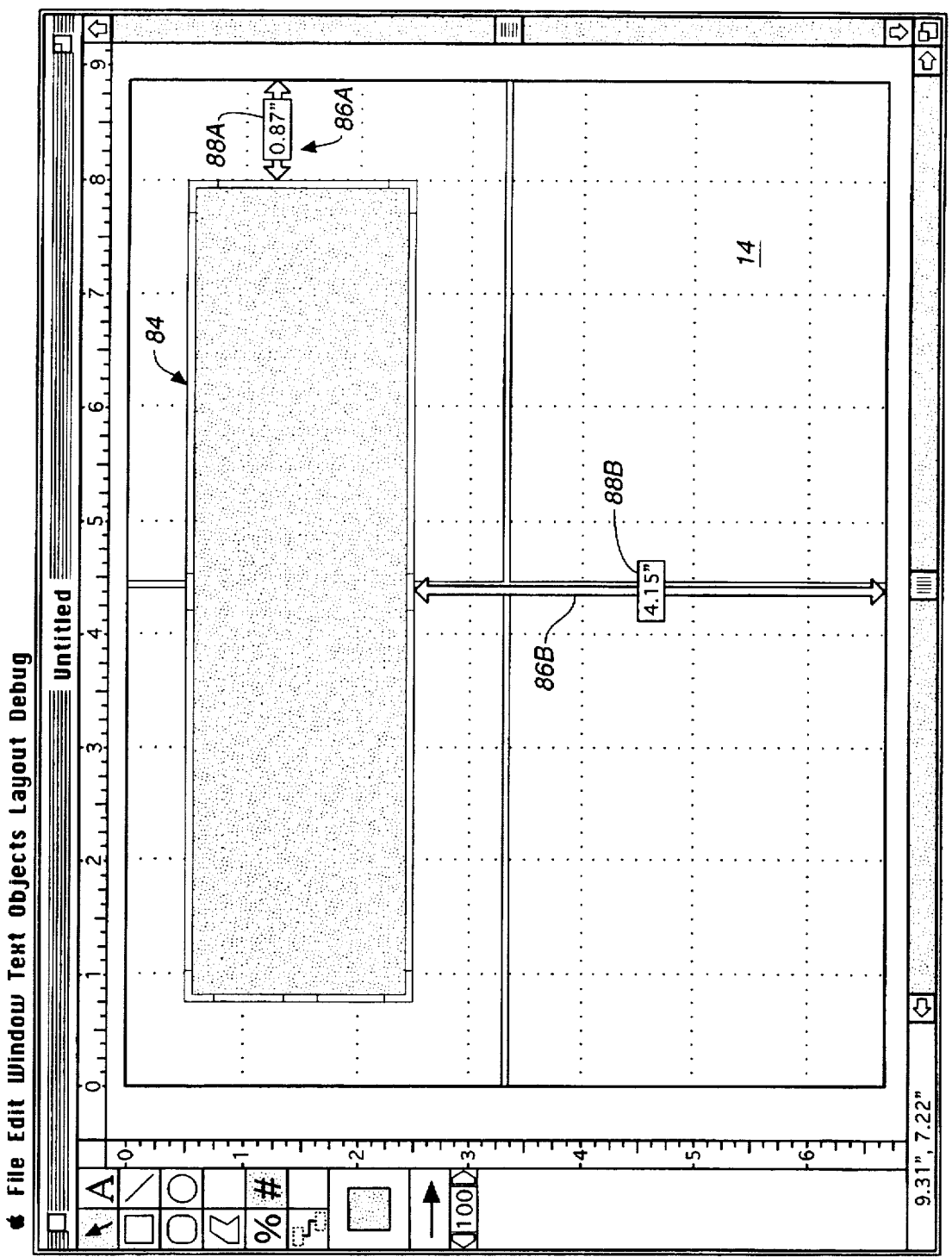
FIG._13

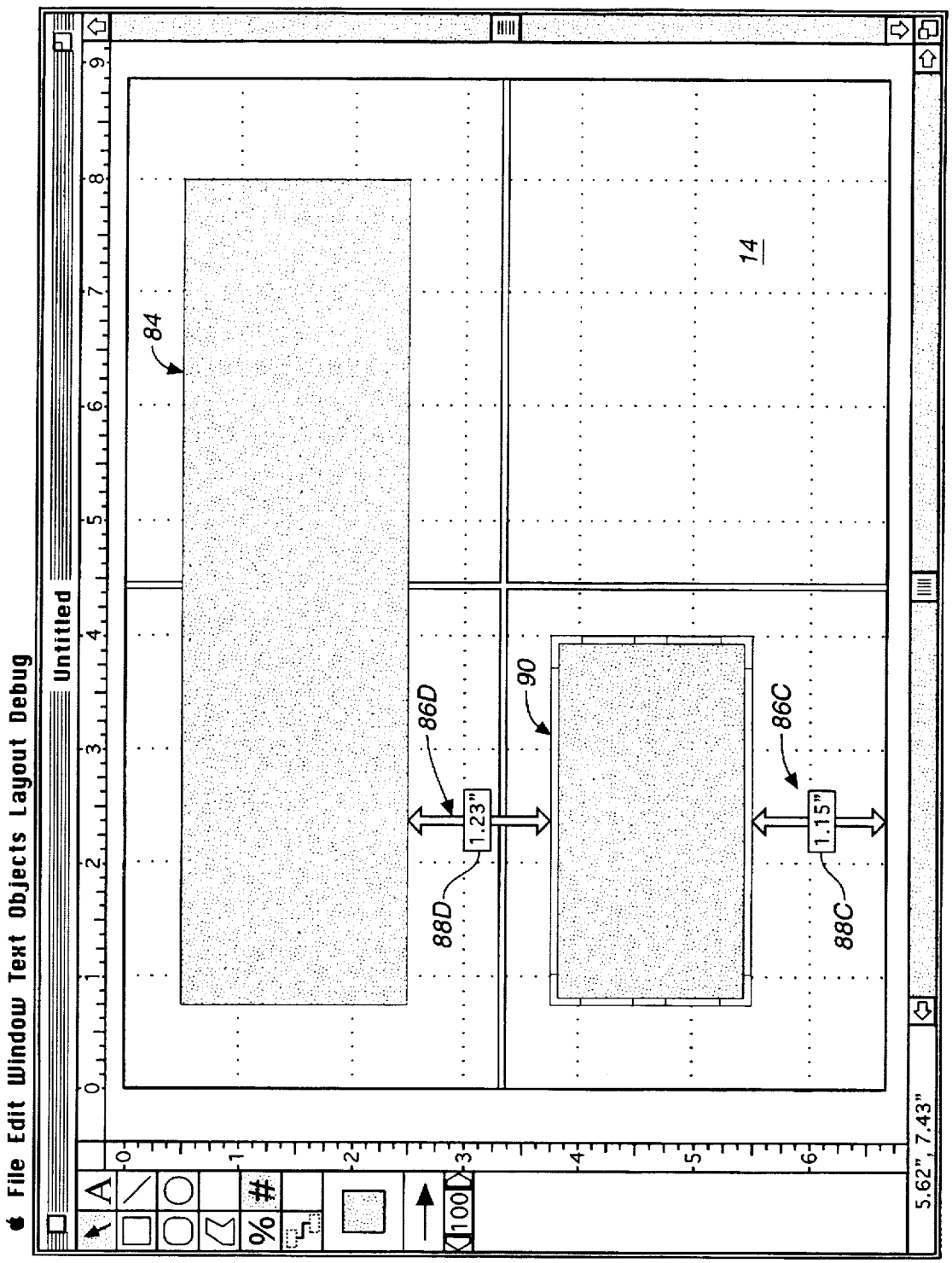
FIG._14

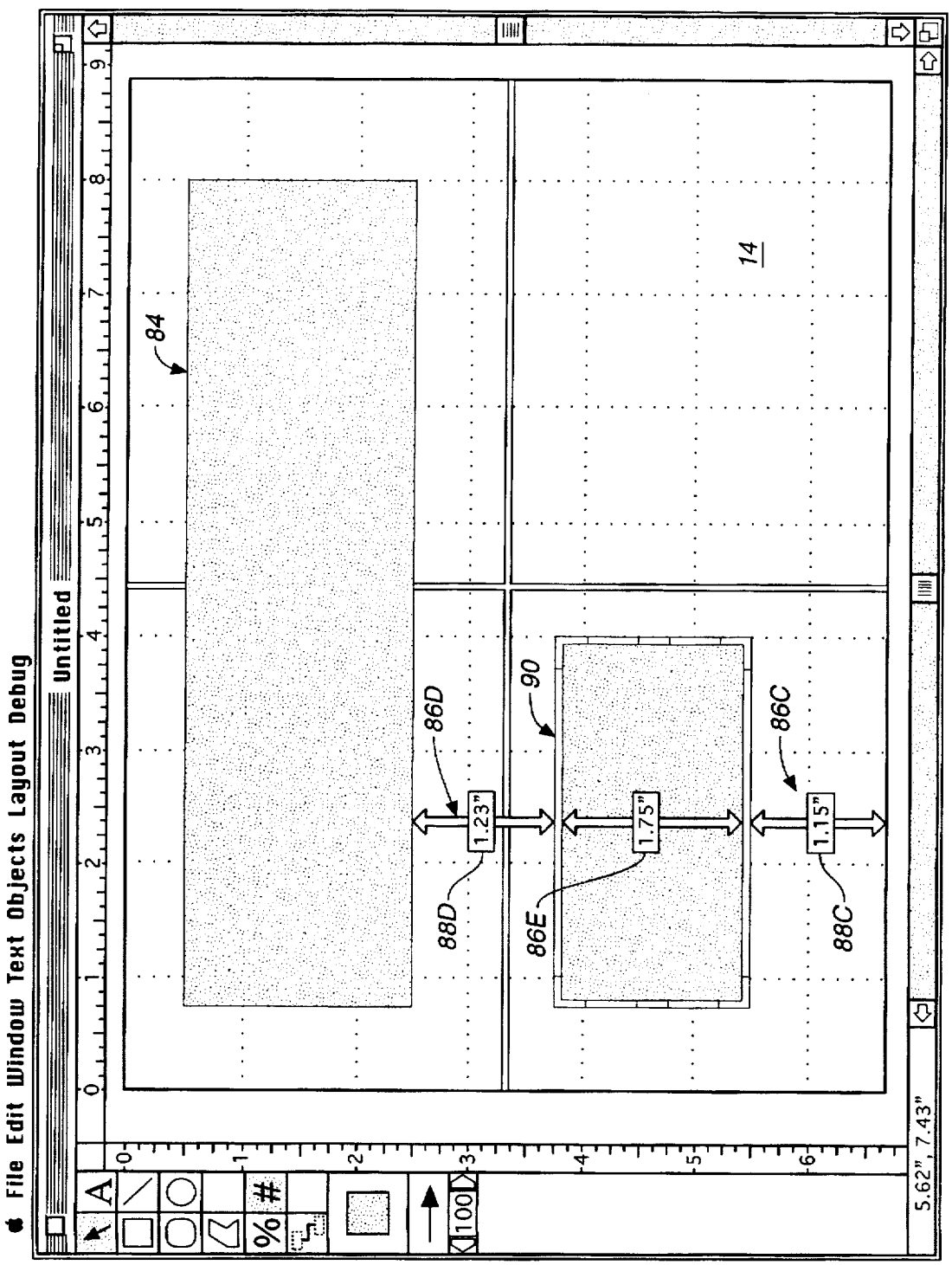
FIG._14A

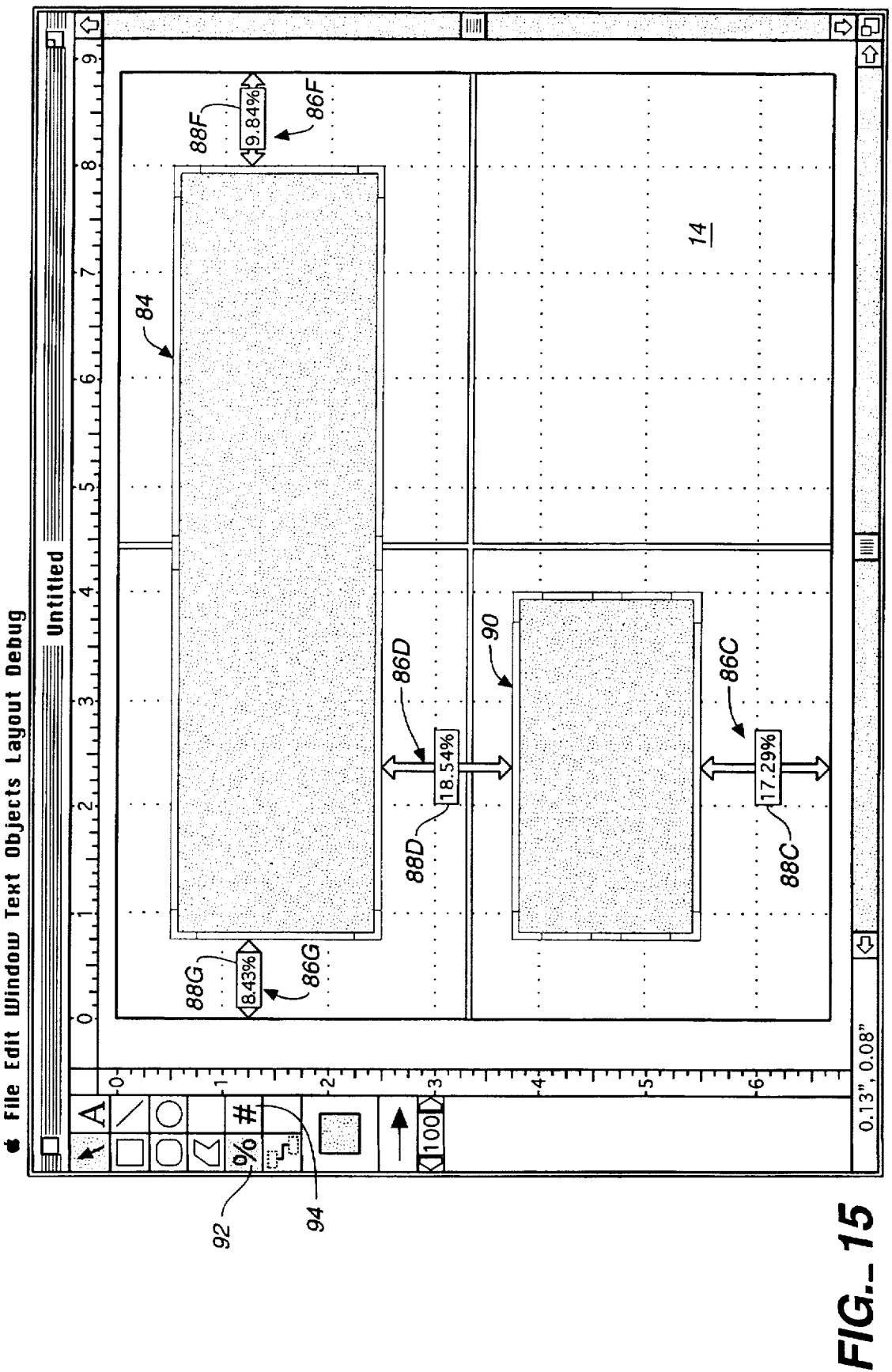
FIG._15

SYSTEM FOR DESIGNING DYNAMIC LAYOUTS ADAPTABLE TO VARIOUS DISPLAY SCREEN SIZES AND RESOLUTIONS

BACKGROUND OF THE INVENTION

The present invention relates in general to text and graphics display systems and, more particularly, to a system for designing a layout for a display screen, such as the display screen of a personal computer. Specifically, one embodiment of the invention provides a system for designing dynamic page layouts that automatically adapt to various sizes and resolutions of display screens. The layout system in accordance with one embodiment of the invention is also intuitive and gestural in character to thereby facilitate the design of page layouts by a user.

Although an illustrative embodiment of the invention will be described in connection with providing a dynamic display screen layout for a personal computer, the system of the invention is generally applicable to any text and/or graphics display system. By way of further example, the layout system of the invention can be used to provide a dynamic page layout tool in any graphics design or text formatting system having a programmable general purpose computer, including workstations, servers, and mainframe computers, or specially programmed text and graphics processors. Therefore, use of the layout system to provide dynamic page layouts for a personal computer display screen is by way of example only and not by way of limitation.

Text and graphics display systems are commonplace. The sizes and resolutions of display systems can vary from one system to another. For example, cathode ray tube (CRT) monitors and liquid crystal display (LCD) panels typically employed as the display screens in desk top and portable computers are commercially available in a variety of sizes and resolutions. Monitors are commercially available in 14-, 15-, 17-, 21-, etc. inch sizes, and resolutions can be VGA, EGA, etc.

Drawing application software is commercially available to configure the user interface of a text and graphics display system in a personal computer. Known drawing application software comprises subroutines for creating graphic objects on a display screen and organizing them to provide a display screen layout and occasionally having those objects contain data, including, for example, a rectangular box filled with text, a rectangular box containing a picture or other graphics, or a rectangular box with an outline or a list of headlines within the box. However, known drawing application software does not provide an effective display screen layout tool for organizing graphic objects on a display screen.

Considered in more detail, one shortcoming of known drawing application software is that it does not provide a capability to group objects other than a simple grouping command to lump a set of objects together. However, once the objects are lumped together by selection of the grouping command by the user, the user is prevented from individually manipulating any object in the group. Consequently, the grouping command does not provide sufficient flexibility for organizing graphic objects in a display screen layout. Also, although objects can be grouped, the drawing application software does not enable the user to individually manipulate the attributes of an object, for example, individually change fill color.

Although conventional drawing application software enables alignment of objects, for example, locating left or top edges at a selected coordinate position, another shortcoming of drawing application software is that the user cannot specify permanent alignment. Consequently, if the user moves or re-sizes one of objects, alignment is destroyed.

Also, known window program management software incorporates a subroutine which provides a selection to the user to arrange previously drawn icons on a display screen. This enables the user to move any group icon by dragging it with a mouse. In order to arrange group icons, the user selects any group icon. Then, from a menu, the user selects an "Arrange Icons" item to distribute the group icons evenly along the lower edge of the window. Using the mouse, the user can drag individual icons to a new location. Consequently, as in the case of the conventional drawing application software, alignment of the icons is destroyed.

Additionally, in order to re-arrange program-item icons, known windows program management software also enables the user to select a particular group window that contains the program-item icons that he or she wants to re-arrange. Then, from the menu, the user selects the "Arrange Icons" item to distribute the program-item icons evenly within the selected group window. However, the user can again drag the individual program-item icons to a new location using the mouse, and, consequently, alignment of the icons is lost.

Furthermore, Microsoft Windows, Version 3.1, available from Microsoft Corporation of Redmond, Wash. includes an "Options" menu that allows the user to select an "Auto Arrange" item. Selection of the "Auto Arrange" item causes icons to be automatically aligned. See "User's Guide, Microsoft Windows, Version 3.1," Microsoft Corporation, 1990–1992, p. 76. However, the "Auto Arrange" subroutine provides limited automatic re-arrangement of icons. Moreover, the automatic re-arrangement is only temporary, since individual icons can be subsequently moved independently, whereupon alignment of the icons is lost. Therefore, if any icon is moved, the icons must be re-aligned.

An additional shortcoming of conventional drawing application software is that the user is not able to build conglomerate objects in a natural way. For example, in order to create a rectangular box containing text that could be edited to grow and shrink and have the box grow and shrink, as well as have box remain in the selected coordinate position as the box grows and shrinks with the edited text, and also have an attached shadow move and grow and shrink accordingly, the user must create three separate objects and use cumbersome grouping and ungrouping commands, which is very tedious and time-consuming.

Another shortcoming of known drawing application software is that objects that are laid-out remain fixed in size. Consequently, the drawing application software does not automatically adjust the size of the objects if the user desires to change the size of the page or the display screen size or resolution is altered. Consequently, if the user re-sizes the page, for example, he or she must also re-size the objects.

Therefore, there is a need for an improved layout tool for drawing objects and organizing the drawn objects. It would also be desirable that the layout tool facilitate creation of objects to provide a custom dashboard layout, as well as serve as a layout manager for organization of the objects. Additionally, it would be desirable to provide a layout tool that enables objects to be manipulated individually or as a group and enable the user to arrange the objects permanently. It would further be desirable that the layout tool automatically move objects and cause them to grow and shrink automatically to adapt the size and position of objects if the size of the page or size or resolution of the display screen is altered.

SUMMARY OF THE INVENTION

One embodiment of the invention generally provides an improved layout system for drawing objects and organizing the drawn objects. The layout system facilitates creation of objects, such as boxes that can contain text, graphics (e.g., pictures), animation, video, outlines, titles, headlines, and other information and data, to provide a custom dashboard layout, as well as serves as a layout manager for organization of the objects. Additionally, the layout system enables objects to be manipulated individually or as a group and to be arranged permanently in various relationships, in which various components or attributes of the objects are interrelated. Preferably, the layout system enables a user to interrelate objects in one or more permanent relationships by selectively distributing, aligning, sizing, and/or spacing the objects.

The layout system in accordance with one embodiment of the invention also provides a graphical user interface design tool for designing dynamic page layouts that automatically adapt to various page sizes and display screen sizes and resolutions. The layout system enables objects to be connected to the edge or edges of a page in an intuitive and gestural manner to provide a dynamic page layout tool that automatically moves objects and causes them to grow and shrink automatically to adapt the size and position of the objects if the page is re-sized or the size or resolution of the display screen is altered.

BRIEF DESCRIPTION OF THE DRAWINGS

The above and other objects and features and the concomitant advantages of the present invention will be better understood and appreciated by those skilled in the art in view of the description of the preferred embodiments given below in conjunction with the accompanying drawings. In the drawings:

FIG. 1 illustrates one embodiment of the layout system in accordance with the invention for providing a dynamic dashboard layout for a display screen, which is automatically adaptable to changes in page size or display screen size and resolution;

FIG. 2 shows a window associated with the layout system shown in FIG. 1;

FIG. 3 illustrates a "Layout" menu item in the window shown in FIG. 2;

FIG. 4, comprising FIGS. 4A and 4B, illustrates alternate "Distribute" dialog boxes selected from the "Layout" menu shown in FIG. 3;

FIG. 5, comprising FIGS. 5A and 5B, illustrates alternate "Alignment" dialog boxes selected from the "Layout" menu shown in FIG. 3;

FIG. 6, comprising FIGS. 6A and 6B, illustrates alternate "Sizing" dialog boxes selected from the "Layout" menu shown in FIG. 3;

FIG. 7, comprising FIGS. 7A and 7B, illustrates alternate "Spacing" dialog boxes selected from the "Layout" menu shown in FIG. 3;

FIG. 8 illustrates a "File" menu item in the window shown in FIG. 2;

FIG. 9 illustrates a preferences dialog box selected from the "File" menu shown in FIG. 8;

FIG. 10 illustrates a relations box resulting from selection of an item in the preferences dialog box shown in FIG. 10;

FIG. 11 illustrates a "Debug" menu item in the window shown in FIG. 2;

FIGS. 13, 14, 14A, and 15 illustrate dynamic page layouts associated with a connect subroutine of the layout system shown in FIG. 1.

DETAILED DESCRIPTION OF THE PREFERRED EMBODIMENTS

Figure 12:
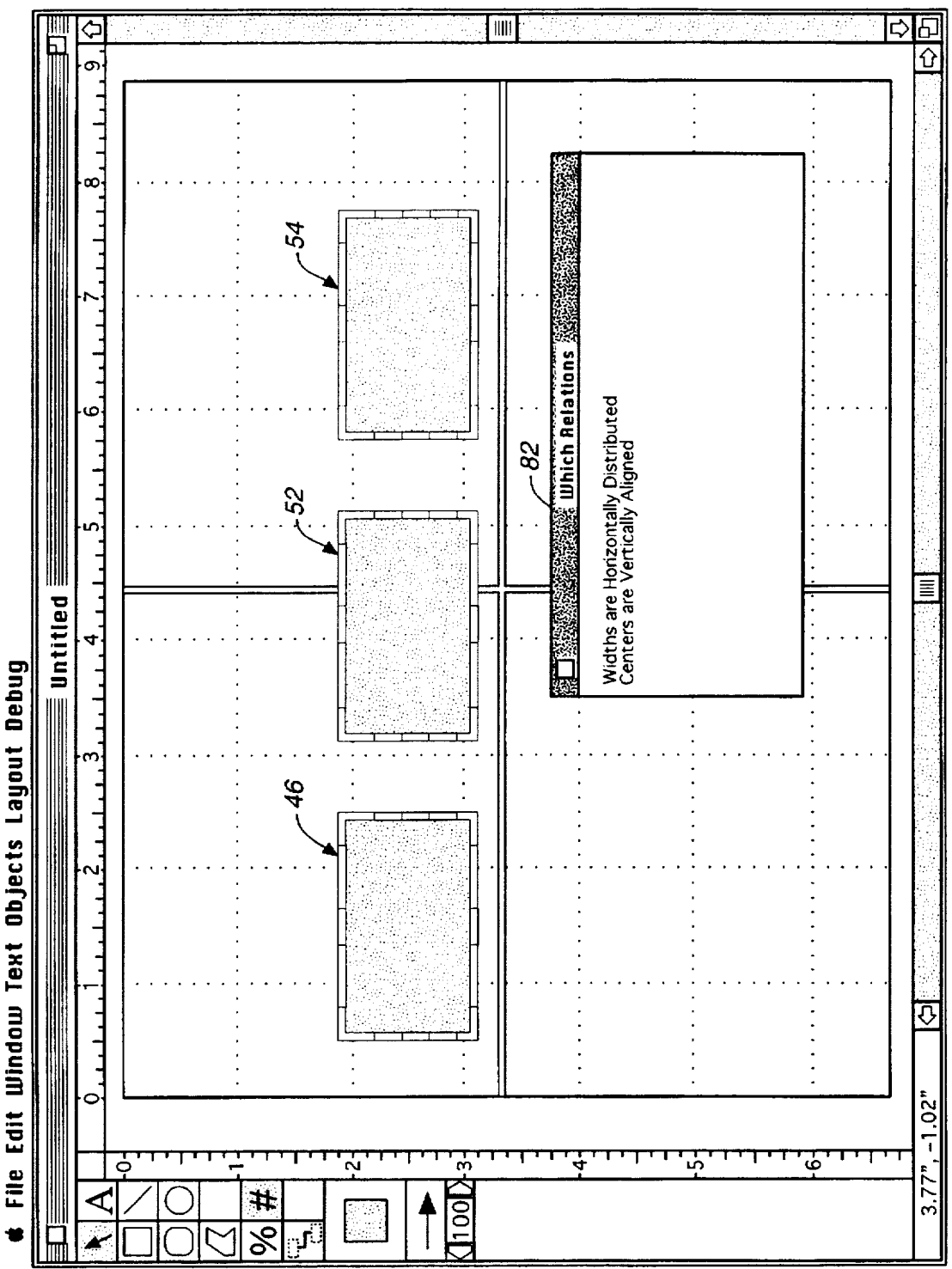
FIG. 12 illustrates a "Which Relations" dialog box selected from the "Debug" menu shown in FIG. 11.

The layout system provided by one embodiment of the invention can be used for facilitating the design of custom dashboard layouts and dynamic page layouts that automatically adapt to various display screen sizes and resolutions. One preferred embodiment provides such a layout system for a personal computer. For example, the layout system in accordance with one preferred embodiment of the invention can be used to design the graphical user interface on Macintosh platforms, including Power Macintosh and 68000 Macintosh computers, commercially available from Apple Computer located in Cupertino, Calif. Another preferred embodiment provides a layout system that can be used to design the graphical user interface on Windows platforms, including 32-bit Windows platforms (Windows NT or Windows '95), as well as 16-bit Windows platforms (Windows 3.1), available from Microsoft Corporation based in Redmond, Wash.

The preferred embodiment to be described shortly is an application version of the layout system in accordance with the invention. In another preferred embodiment, the layout system is a run-time version with a statically linked library having an object-oriented application programming interface (API) that can be included in any other computer software application program. In another preferred embodiment, the layout system is a run-time version with a dynamically linked library having an object-oriented application programming interface (API) that can be included in any other computer software application program. In an additional embodiment, the layout system is a component of an object system such as OLE (Object Linking and Embedding) from Microsoft Corporation of Redmond Wash., or OpenDoc from Apple Computer, of Cupertino, Calif. In such an open environment the object could be a container for other objects. Therefore, the layout system in accordance with the invention can be a stand-alone program or can be integrated into another software application program product to provide a dynamic screen layout capability to the user to customize the graphical user interface for that application program.

One preferred embodiment of the layout system in accordance with the invention will now be described in detail. The preferred embodiment to be described is an application version of the layout system comprising a program of subroutines configured to execute on a Power Macintosh platform.

One embodiment of the layout system for designing a custom dashboard graphical user interface and dynamic page layouts adaptable to various display screen sizes and resolutions in accordance with the invention is generally indicated by the numeral 1 in FIG. 1. As shown in FIG. 1, the layout system 1 comprises program having a plurality of subroutines that execute on a personal computer 2. For example, the personal computer 2 can be a Power Macintosh personal computer having eight megabytes of random access memory (RAM) and a 100 megabyte hard drive. The layout system 1 also preferably comprises a color monitor 4, such as a 17" color monitor (1024×768), together with a 256 or more colors graphics card (1024×768 resolution) installed in the personal computer 2. As shown in FIG. 1, the layout system 1 also preferably comprises a mouse 6 having a mouse button 6A. Additionally, the layout system 1

When the layout system 1 in accordance with the invention is selected by a user, the program resident in the personal computer 2 causes a window 10 to appear on a display screen 12 of the monitor 4, as shown in FIG. 2. The window 10 is preferably subdivided into regions. One region is a page 14 to be provided with a page layout. As shown in FIG. 2, the page 14 is preferably divided into quadrants by crosshairs 16. The page 14 is also preferably provided with orthogonal guidelines which collectively form a grid 18. For example, the grid 18 can consist of horizontal and vertical dotted lines, as shown in FIG. 2. The crosshairs 16 and grid 18 facilitate a visually symmetrical layout of the page 14 by the user.

Additionally, a horizontal gauge 20 is preferably provided along at least one of the horizontal edges of the page 14, for example, the top edge, as shown in FIG. 2. Also, a vertical gauge 22 is preferably provided along at least one vertical edge of the page 14, for example, the left edge. As shown in FIG. 2, the horizontal and vertical gauges 20 and 22 can be scaled in inches. Alternatively, the scale can be centimeters or any other desired scale. Additionally, a horizontal position indicator 24 is displayed along the horizontal gauge 20, and a vertical position indicator 26 is displaced along the vertical gauge 22 to display the position of a mouse pointer 28. Also, the position of the mouse pointer 28 can be displayed in a numerical coordinate display 30, which indicates a coordinate position of, for example, "0.66", 1.19 "."

As shown in FIG. 2, another region of the screen 12 is a menu bar 32 which lists available menus, including, a "File" menu, an "Edit" menu, a "Window" menu, a "Text" menu, an "Objects" menu, a "Layout" menu, and a "Debug" menu. Certain of these menus will be described in more detail below.

Another region of the window 10 is a palette 34. The palette 34 will also be described in more detail below.

In order to initiate a design for a custom dashboard layout comprising various objects, the user manipulates the mouse pointer 28 to point to "Layout" in the menu bar 32. When the user clicks the mouse button 6A on the "Layout" item in the menu bar 32, a layout menu 36 appears, as shown in FIG. 3.

As shown in FIG. 3, the layout system I in accordance with one embodiment of the invention enables the user to select one or more of four primary layout functions. These layout functions comprise: a distribution function 38 identified by the "Distribute ... " item in the layout menu 36; an alignment function 40 identified by the "Align ... " item in the layout menu; a sizing function 42 identified by the "Size ... " item in the layout menu; and a spacing function 44 identified by the "Space ... " item in the layout menu. These functions are performed by subroutines in the program stored on the hard drive of the personal computer 2 shown in FIG. 1. In order to select one of these subroutines, the user manipulates the mouse pointer 28 to point to a desired layout function (i.e., "Distribute ... ," "Align ... ," "Size ... ," or "Space ... ") and clicks the mouse button 6A, and an associated dialog box appears, as will now be described with reference to FIGS. 4A, 4B, 5A, 5B, 6A, 6B, 7A, and 7B.

In order to facilitate an understanding of the distribution function 38, alignment function 40, sizing function 42, and spacing function 44, three objects are preferably created, as shown in FIG. 4A. In order to create a first object 46, the user can manipulate the mouse pointer 28 to point to a desired shape for the object in the palette 34, for example, a rectangle 48. The user then repositions the mouse pointer 28 to a blank region of the page 14 and clicks the mouse button 6A and drags to span a rectangle to create the first object 46. The first object 46 comprises a field 46A. The user can also create a second object 52 having a field 52A and a third object 54 having a field 54A by repeating the same steps employed to create the first object 46. Additionally, the user can fill the selected object with a desired color or pattern, such as stippling, by manipulating the mouse pointer 28 to point to a fill selection icon 50 and clicking the mouse button 6A.

The user can select an object by manipulating the mouse pointer 28 to point to the object to be selected (e.g., the first object 46) and by then clicking the mouse button 6A. When the first object 46 is selected in this manner, the perimeter of the object is preferably outlined with a hatched border 46B. In a conventional manner, the user can also select one or more objects (e.g., the first object 46, second object 52, and third object 54) by clicking the mouse button 6A in a blank region of the page 14 and dragging to draw a box (not shown) which encompasses the objects desired to be simultaneously selected. For example, if the user also selects the second object 52 and third object 54 in this manner, the perimeter of the second object is preferably outlined with a hatched border 52B and the perimeter of the third object 54 is preferably provided with a hatched border 54B. If the user desires to unselect a previously selected object or objects, he or she simply clicks the mouse button 6A in the blank region of the page 14.

Any of the objects (i.e., the first object 46, second object 52, or third object 54) can be repositioned if the user manipulates the mouse pointer 28 to point to the object and clicks the mouse button 6A and drags the object to the desired position on the page 14. That is, when the user clicks on any object, the user can move that object around the display screen 12. As will be described later, the user can preferably also move all of the objects (i.e., the first object 46, second object 52, and third object 54) in unison together as a group.

The first layout function of the preferred embodiment of the layout system 1 of the invention to be described is the distribution function 38, which the user can select to establish a distributed relationship among the first object 46, second object 52, and third object 54. The distribution function 38 is accessed by the user manipulating the mouse pointer 28 to point to "Layout" in the menu bar 32 and clicking the mouse button 6A on the "Layout" item and then manipulating the mouse pointer to point to the "Distribute . . . " item in the "Layout" menu and clicking the mouse button on the "Distribute ... " item to display a "Distribute" dialog box 56, as shown in FIG. 4A. When the distribution function 38 is active, all objects (i.e., the first object 46, second object 52, and third object 54) are selected.

The distribution function 38 enables the user to select "Evenly distribute objects" by manipulating the mouse pointer 28 to point to "Evenly distribute objects" and then clicking the mouse button 6A, thereby overriding a default setting (i.e., "Do not evenly distribute"). Selection of "Evenly distribute objects" provides equal distribution among objects.

Selection of the distribution function 38 enables the user to further select whether the distribution among the first object 46, second object 52, and third object 54 is equal either horizontally or vertically or both horizontally and vertically. In order to select equal horizontal distribution, the user manipulates the mouse pointer 28 to point to "Horizontal" in the "Distribute" dialog box 56 and then clicks the mouse button 6A. Similarly, the user manipulates the mouse pointer 28 to point to "Vertical" in the "Distribute" dialog box 56 and clicks the mouse button 6A in order to select equal vertical distribution. The user sequentially selects "Horizontal" and "Vertical" in the "Distribute" dialog box 56 to select both equal horizontal and vertical distribution. A preview of the result of the selection or selections by the user using the distribution function 38 is graphically displayed in a "Distribute" dialog box screen 58, as shown in FIG. 4A. Additionally, the user can select "Once Only" or "Permanent" in the "Distribute" dialog box 56. The user selects "Once Only" by manipulating the mouse pointer 28 to point to "Once Only" and clicking the mouse button 6A. If, on the one hand, the user selects "Once Only," the distribution selected by the user can be overridden by the user if he or she subsequently manipulates the mouse pointer 28 to point to any object (i.e., the first object 46, second object 52, or third object 54), clicks the mouse button 6A, and moves the selected object. Similarly, the user selects "Permanent" by manipulating the mouse pointer 28 to point to "Permanent" and clicking the mouse button 6A. If the user selects "Permanent," the distribution selected by the user can be removed by the user, for example, if he or she subsequently manipulates the mouse pointer 28 to select "Do not evenly distribute" in the "Distribute" dialog box 56 and clicks the mouse button 6A. The user can then close the "Distribute" dialog box 56 by manipulating the mouse pointer 28 to point to the control-menu box in the upper-left corner of the "Distribute" dialog box and clicking the mouse button 6A.

By way of example, the user can select the "Horizontal," "Evenly distribute objects," and "Once Only" items in the "Distribute" dialog box 58 shown in FIG. 4A while the distribution function 38 is active. The user can then close the "Distribute" dialog box 56 by manipulating the mouse pointer 28 to point to the control-menu box in the upper-left corner of the "Distribute" dialog box 58 and clicking the mouse button 6A. In response, the first object 46, second object 52, and third object 54 assume a temporary distribution that corresponds to the selected distribution that was displayed by the "Distribute" dialog box screen 58 prior to the time that the "Distribute" dialog box was closed. If the user selects any object (i.e., the first object 46, second object 52, or third object 54) by manipulating the mouse pointer 28 to point to the object and clicking the mouse button 6A and dragging, the selected object can be moved, and the temporary distribution relationship dissolves. If the user had selected "Permanent" instead of "Once Only," the first object 46, second object 52, and third object 54 continue to be arranged in a distribution that corresponds to the selected distribution that was displayed by the "Distribute" dialog box screen 58 prior to the time that the "Distribute" dialog box was closed. When the user then selects any object (i.e., the first object 46, second object 52, or third object 54) by manipulating the mouse pointer 28 to point to the object and clicking the mouse button 6A and dragging, all of the objects move in unison together as a group, and a permanent distribution relationship is maintained among the three objects. Consequently, if "Permanent" is selected, when one of the objects (i.e., the first object 46, second object 52, or third object 54) is moved, the other objects move so that the distribution is equal. If the rightmost of the objects (i.e., the third object 54) is moved toward the right edge of the page 14, the center object (i.e., the second object 52) moves to the right so that the horizontal distance between all three objects is equal. That is, the distance between the first and second objects 46 and 52 is automatically maintained equal to the distance between the second and third objects 52 and 54.

In response to selection by the user of the "Permanent" item, when the user moves one of the objects (i.e., the first object 46, second object 52, or third object 54), they all move in unison together as a group while at the same time the selected relationship (e.g., horizontally evenly distributed) is maintained as an object is moved. This is a more powerful page layout tool than any graphics product that is known to exist on the market today, because the layout system I in accordance with the invention enables the user to set up a permanent relationship between objects when he or she selects the "Permanent" item. The user can therefore set up and maintain a permanent relationship among objects, even if he or she subsequently moves and/or re-sizes any of the objects. Also, the layout system 1 is a vast improvement over grouping functions as they exist in known graphics products, because the layout system 1 nonetheless enables the user to alter any object individually even though the objects are grouped in a relationship. That is, the relationship is maintained as the user moves or re-sizes any object.

Also, although objects are grouped in a relationship, selection of the "Permanent" item enables the user to change attributes of any object and still maintain the relationship. For example, the user can manipulate the mouse pointer 28 to point to the fill selection icon 50 in the palette 34 and click the mouse button 6A to select a color or other desired fill attribute, and then can click on any individual object (i.e., the first object 46, second object 52, or third object 54) and individually change the fill attribute of that object, despite the fact that the objects exist in a relationship. That is, the layout system 1 permits objects to operated on individually, even though the objects are grouped.

The second layout function of the preferred embodiment of the layout system 1 of the invention to be described is the alignment function 40, which the user can select to establish a desired relationship of components, such as the edges or centers, among the first object 46, second object 52, and third object 54. Referring again to FIG. 3, the alignment function 40 is accessed by the user pointing the mouse pointer 28 to point to "Layout" in the menu bar 32 and clicking the mouse button 6A on the "Layout" item and then manipulating the mouse pointer to point to "Align . . . " in the "Layout" menu and clicking the mouse button on the "Align . . . " item to display an "Alignment" dialog box 60, as shown in FIG. 5A. When the alignment function 40 is active, all objects (i.e., the first object 46, second object 52, and third object 54) are selected.

The alignment function 40 enables the user to select "Left" edge alignment, "Center" alignment, or "Right" edge alignment when the user selects "Horizontal" by manipulating the mouse pointer 28 to point to "Horizontal" and then clicking the mouse button 6A. The user can then select "Left" edge, "Center," or "Right" edge alignment by manipulating the mouse pointer 28 to point to the desired item and then clicking the mouse button 6A, thereby overriding a default setting (i.e., "None"). Selection of "Left" edge, "Center," or "Right" edge alignment provides left edge justification, centering, and right edge justification of objects, as shown by the icons that appear in the "Left," "Center," and "Right" items, respectively. A preview of result of the selection or selections by the user using the horizontal alignment function 40 is graphically displayed in the "Alignment" dialog box screen 62 shown in FIG. 5A.

The alignment function 40 also enables the user to select "Top" edge alignment, "Center" alignment, or "Bottom" edge alignment when the user selects "Vertical" by manipulating the mouse pointer 28 to point to "Vertical" and then clicking the mouse button 6A, as shown in FIG. 5B. The user can then select "Top" edge, "Center," or "Bottom" edge alignment by manipulating the mouse pointer 28 to point to the desired item and then clicking the mouse button 6A, thereby overriding the default setting (i.e., "None"). Selection of "Top" edge, "Center," or "Bottom" edge alignment provides top edges at the same vertical position, centers at the same vertical position, or bottom edges at the same vertical position for objects, as shown by the icons that appear in the "Top," "Center," and "Bottom" items, respectively. A preview of the result of the selection or selections by the user using the vertical alignment function 40 is graphically displayed in the "Alignment" dialog box screen 62 shown in FIG. 5B.

Additionally, after a horizontal or vertical alignment is selected by the user, the user can select "Once Only" or "Permanent" in the "Alignment" dialog box 60. The user selects "Once Only" by manipulating the mouse pointer 28 to point to "Once Only" and clicking the mouse button 6A. If, on the one hand, the user selects "Once Only," the alignment selected by the user can be overridden by the user if he or she subsequently manipulates the mouse pointer 28 to point to any object (i.e., the first object 46, second object 52, or third object 54), clicks the mouse button 6A, and moves the selected object. Similarly, the user selects "Permanent" by manipulating the mouse pointer 28 to point to "Permanent" and clicking the mouse button 6A. If the user selects "Permanent," the alignment selected by the user can be unselected by the user, for example, if he or she subsequently manipulates the mouse pointer 28 to point to "None" in the "Alignment" dialog box 56 and clicks the mouse button 6A. The user can then close the "Alignment" dialog box 60 by manipulating the mouse pointer 28 to point to the control-menu box in the upper-left corner of the "Alignment" dialog box and clicking the mouse button 6A.

The alignment function 40 enables the user to vertically align objects by aligning top edges, centers, or bottom edges. Additionally, the user can align left edges, centers, or right edges in horizontal alignment. When the user selects an alignment, a screen in the "Alignment" dialog box 60 displays a preview of the selected alignment.

For example, the user can select the "Vertical," "Center," and "Once Only" items in the "Alignment" dialog box 60 shown in FIG. 5B while the alignment function 40 is active. The user can then close the "Alignment" dialog box 60 by manipulating the mouse pointer 28 to point to the control-menu box in the upper-left corner of the "Alignment" dialog box and clicking the mouse button 6A. In response, the first object 46, second object 52, and third object 54 align in a temporary alignment that corresponds to the selected alignment that was displayed by the "Alignment" dialog box screen 62 prior to the time that the "Alignment" dialog box was closed. If the user selects any object (i.e., the first object 46, second object 52, or third object 54) by manipulating the mouse pointer 28 to point to the object and clicking the mouse button 6A and dragging, the selected object can be moved, and the temporary alignment vanishes. If the user had selected "Permanent" instead of "Once Only," the first object 46, second object 52, and third object 54 align in a fixed alignment that corresponds to the selected alignment that was displayed by the "Alignment" dialog box screen 62 prior to the time that the "Alignment" dialog box was closed. When the user then selects any object (i.e., the first object 46, second object 52, or third object 54) by manipulating the mouse pointer 28 to point to the object and clicking the mouse button 6A and dragging, all of the objects move in unison together as a group, and alignment is maintained in a permanent alignment relationship between the three objects.

The third layout function of the preferred embodiment of the layout system 1 of the invention to be described is the sizing function 42, which the user can select to establish a desired size relationship among the first object 46, second object 52, and third object 54. Referring once again to FIG. 3, the sizing function 42 is accessed by the user manipulating the mouse pointer 28 to point to "Layout" in the menu bar 32 and clicking the mouse button 6A on the "Layout" item and then manipulating the mouse pointer to point to "Size . . . " in the "Layout" menu and clicking the mouse button on the "Size . . . " item to display a "Sizing" dialog box 64, as shown in FIG. 6A. When the sizing function 42 is active, all objects (i.e., the first object 46, second object 52, and third object 54) are selected.

The sizing function 42 enables the user to select the "Horizontal" item by manipulating the mouse pointer 28 to point to "Horizontal" and then clicking the mouse button 6A. The user can then select "Maintain same width" by manipulating the mouse pointer 28 to point to "Maintain same width" and then clicking the mouse button 6A, thereby overriding a default setting (i.e., "No width rule"). Selection of "Maintain same width" causes the objects (i.e., the first object 46, second object 52, and third object 54) to become the same width. A preview of result of the selection by the user using the horizontal sizing function 42 is graphically displayed in the "Sizing" dialog box screen 66 shown in FIG. 6A.

Similarly, the sizing function 42 enables the user to select the "Vertical" item by manipulating the mouse pointer 28 to point to "Vertical" and then clicking the mouse button 6A. The user can then select "Maintain same height" by manipulating the mouse pointer 28 to point to "Maintain same height" and then clicking the mouse button 6A, thereby overriding a default setting (i.e., "No height rule"). Selection of "Maintain same height" causes the objects (i.e., the first object 46, second object 52, and third object 54) to become the same height. A preview of result of the selection by the user using the vertical sizing function 42 is graphically displayed in the "Sizing" dialog box screen 66 shown in FIG. 6B.

The sizing function 42 enables the user to specify objects to have an identical width, an identical height, or both an identical width and an identical height. Although the widths of the objects are identical and/or the heights of the objects are identical, the width and height can be any desired dimension. When the user selects the desired sizing, a screen in the "Sizing" dialog box 64 displays a preview of the selected sizing relationship (width or height) or relationships (width and height).

For example, the user can select the "Horizontal," "Maintain same width," and "Once Only" items in the "Sizing" dialog box 64 shown in FIG. 6A while the sizing function 42 is active. The user can then close the "Sizing" dialog box 64 by manipulating the mouse pointer 28 to point to the control-menu box in the upper-left corner of the "Sizing" dialog box and clicking the mouse button 6A. In response, the first object 46, second object 52, and third object 54 temporarily become the same width, as indicated by the "Sizing" dialog box screen 66 prior to the time that the "Sizing" dialog box was closed. If the user selects any object (i.e., the first object 46, second object 52, or third object 54) by manipulating the mouse pointer 28 to point to the border of the object (i.e., one of the vertical portions of the border 46B of the first object 46, one of the vertical portions of the border 52B of the second object 52, or one of the vertical portions of the border 54B of the third object 54) and clicking the mouse button 6A and dragging, the selected object can be re-sized in width, and the temporary equivalence of widths disappears. If the user had selected "Permanent" instead of "Once Only," the width of the first object 46, second object 52, and third object 54 remain equal. When the user then selects any object (i.e., the first object 46, second object 52, or third object 54) by manipulating the mouse pointer 28 to point to the border of the object (i.e., one of the vertical portions of the border 46B of the first object 46, one of the vertical portions of the border 52B of the second object 52, or one of the vertical portions of the border 54B of the third object 54) and clicking the mouse button 6A and dragging, the widths of the other objects varies in unison together as a group, as the width of the selected object is altered by the user, so that the width of all the objects remains equal in a permanent equal width relationship among the three objects.

The fourth layout function of the preferred embodiment of the layout system 1 of the invention to be described is the spacing function 44, which the user can select to establish a set distance relationship among the first object 46, second object 52, and third object 54. Referring once again to FIG. 3, the spacing function 44 is accessed by the user manipulating the mouse pointer 28 to point to "Layout" in the menu bar 32 and clicking the mouse button 6A on the "Layout" item and then manipulating the mouse pointer to point to "Space . . . " in the "Layout" menu and clicking the mouse button on the "Space . . . " item to display a "Spacing" dialog box 68, as shown in FIG. 7A. When the spacing function 44 is active, all selected objects (i.e., the first object 46, second object 52, and third object 54) are affected.

The spacing function 44 enables the user to select the "Horizontal" item by manipulating the mouse pointer 28 to point to "Horizontal" and then clicking the mouse button 6A. The user can then select "Object spacing:" by manipulating the mouse pointer 28 to point to "Object spacing:" and clicking the mouse button 6A, thereby overriding a default setting (i.e., "Do not space objects"). Selection of "Object spacing:" enables the user to enter a distance in a spacing box associated with the "Object spacing:" item by means of numeric keys of the keyboard 8 shown in FIG. 1 to cause the objects (i.e., the first object 46, second object 52, and third object 54) to become horizontally separated by the same set distance. A preview of result of the selection by the user using the horizontal spacing function 44 is graphically displayed in a "Spacing" dialog box screen 72 shown in FIG. 7A.

The spacing function 44 also enables the user to select the "Vertical" item by manipulating the mouse pointer 28 to point to "Vertical" and then clicking the mouse button 6A. The user can then select "Object spacing:" by manipulating the mouse pointer 28 to point to "Object spacing:" and clicking the mouse button 6A, thereby overriding a default setting (i.e., "Do not space objects"). Selection of "Object spacing:" enables the user to enter a distance in a spacing box associated with the "Object spacing:" item by means of numeric keys of the keyboard 8 shown in FIG. 1 to cause the objects (i.e., the first object 46, second object 52, and third object 54) to become vertically separated by the same set distance. A preview of result of the selection by the user using the vertical spacing function 44 is graphically displayed in a "Spacing" dialog box screen 72 shown in FIG. 7B.

The spacing function 44 enables the user to specify objects to have a fixed, equal amount of space between objects in the horizontal direction, the vertical direction, or both the horizontal and vertical directions. Although the distances between objects are equal in the horizontal direction and/or equal in the vertical direction, the horizontal distance and the vertical distance can be any desired amount. When the user selects the desired spacing, a screen in the "Spacing" dialog box 68 displays a preview of the selected spacing relationship (horizontal or vertical separation) or relationships (horizontal and vertical separations).

For example, the user can select the "Horizontal" and "Object spacing:" items, set a fixed amount of horizontal separation in the spacing box 70 using the keyboard 8, and then select the "Once Only" item in the "Spacing" dialog box 68 shown in FIG. 7A while the spacing function 44 is active. The user can then close the "Spacing" dialog box 68 by manipulating the mouse pointer 28 to point to the control-menu box in the upper-left corner of the "Spacing" dialog box and clicking the mouse button 6A. In response, the first object 46, second object 52, and third object 54 temporarily become horizontally separated by the same set distance entered in the spacing box 70, as indicated by the preview displayed on the "Spacing" dialog box screen 72 prior to the time that the "Spacing" dialog box was closed. If the user selects any object (i.e., the first object 46, second object 52, or third object 54) by manipulating the mouse pointer 28 to point to the border of the object (i.e., one of the vertical portions of the border 46B of the first object 46, one of the vertical portions of the border 52B of the second object 52, or one of the vertical portions of the border 54B of the third object 54) and clicking the mouse button 6A and dragging, the selected object can be re-sized in width, and the temporary fixed horizontal separation among the objects no longer exists. If the user had selected "Permanent" instead of "Once Only," the fixed amount of horizontal separation among the first object 46, second object 52, and third object 54 is maintained. When the user then selects any object (i.e., the first object 46, second object 52, or third object 54) by manipulating the mouse pointer 28 to point to the border of the object (i.e., one of the vertical portions of the border 46B of the first object 46, one of the vertical portions of the border 52B of the second object 52, or one of the vertical portions of the border 54B of the third object 54) and clicking the mouse button 6A and dragging, the widths of the other objects are not affected, but the fixed horizontal separation among the objects previously set by the user is maintained, as the width of the selected object is altered by the user, so that the horizontal distance between adjacent objects remains fixed at a permanent set distance relationship among the three objects.

As shown in FIG. 8, the user can manipulate the mouse pointer 28 to point to "File" in the menu bar 32 and click the mouse button 6A to select the "File" item, which displays the "File" menu. The user can then manipulate the mouse pointer 28 to point to "Preferences" and click the mouse button 6A to select a preferences function 74 of the page layout system 1. When the preferences function 74 is selected, a preferences dialog box appears, as shown in FIG. 9. As indicated in FIG. 9, the grid 18 can be toggled on or off by selection of a "Show Grid" item using the mouse pointer 28. Also, the horizontal and vertical gauges 20 and 22 can be toggled on or off by selection of a "Show Rulers"

item using the mouse pointer 28. Additionally, the scale for the grid 18 and horizontal and vertical gauges 20 and 22 can be set using the mouse pointer 28 to select "Inches," "Centimeters," or "Pixels."

More significantly, the user can manipulate the mouse pointer 28 to point to "Show Relations" and click the mouse button 6A to select the "Show Relations" item in the preferences dialog box 76 when the preferences function is active. When the "Show Relations" item is selected, a relations box 78, preferably a tinted box, for example, a gray box, is displayed around related objects (i.e., the first object 46, second object 52, and third object 54), as shown in FIG. 10. The relations box 78 is a graphical representation that one or more relationships determined by selection of the distribution function 38, alignment function 40, sizing function 42, and/or spacing function 42 exist among the first object 46, second object 52, and third object 54. The relations box 78 also selects the related objects (i.e., the first object 46, second object 52, and third object 54). Consequently, the user can manipulate the mouse pointer 28 to point to the relations box 78 and click the mouse button 6A and drag the relations box to move and re-size the first object 46, second object 52, and third object 54 in unison together as a group. If the relations box 78 is selected, the user can depress a backspace key on the keyboard 8 shown in FIG. 1 to remove all relationships and delete the relations box.

On the other hand, the user can manipulate the mouse pointer 28 to point to "File" in the menu bar 32 and click the mouse button 6A to again select the "File menu," as shown in FIG. 8. The user can then again select the preferences function 74 by manipulating the mouse pointer 28 to point to "Preferences" and clicking the mouse button 6A, which causes the preferences dialog box 76 to be displayed, as shown in FIG. 9. The user can then manipulate the mouse pointer 28 to point to "Hide Relations" and click the mouse button 6A to hide the graphic depiction of the existence of relationships among the first object 46, second object 52, and third object 54 (i.e., remove the relations box 78) without removing all of the relationships.

Alternatively, as shown in FIG. 11, the user can manipulate the mouse pointer 28 to point to "Debug" in the menu bar 32 and click the mouse button 6A to select the "Debug" item, which displays the "Debug" menu. The user can then manipulate the mouse pointer 28 to point to "Which Relations . . . " and click the mouse button 6A to select a relationship query function 80 of the layout system 1. When the relationship query function 80 is selected, a "Which Relations" screen 82 appears, as shown in FIG. 12.

When the relationship query function 80 is active, the user can ascertain whether any relationship exists between a selected object and any other object and identify any existing relationship or relationships that exist. When no object is selected, the "Which Relations" screen 82 preferably displays "Nothing selected."

In order to display a list of relationships, if any, for a particular object on the "Which Relations" screen 82, the user manipulates the mouse pointer 28 to point to any object (i.e., the first object 46, second object 52, or third object 54) and clicks the mouse button 6A to select the object. When the object (i.e., the first object 42, second object 52, or third object 54) is selected, any relationship that exists between that object any the other object or objects effected by using the distribution function 38, alignment function 40, sizing function 42, and/or spacing function 44 is displayed on the "Which Relations"screen 82, as shown in FIG. 12. The "Which Relations" screen 82 provides a textual representation that one or more relationships determined by selection of the distribution function 38, alignment function 40, sizing function 42, and/or spacing function 42 exist among the first object 46, second object 52, and third object 54. For example, the "Which Relations" screen 82 indicates that "Widths are Horizontally Distributed" and "Centers are Vertically Aligned," as a result of previous selections using the distribution function 38 and the alignment function 40, respectively. That is, the "Which Relations"screen 82 displays the status of any relationship that exists (i.e., "Widths are Horizontally Distributed" and "Centers are Vertically Aligned"). Also, if the user were to create a new object (not shown) without any relationships to the other objects (i.e., the first object 46, second object 52, and third object 54), the "Which Relations" screen 82 would display "Not in any relations." The user can manipulate the mouse pointer 28 to point to the close-menu box in the upper-right corner of the "Which Relations" screen 82 and click the mouse button 6A to close the "Which Relations" screen and exit the relationship query function 80.

The layout system 1 of the invention also enables any object to be connected to any other object or objects and/or to be connected to an edge or edges of the page 14. This provides automatic repositioning of any interconnected objects, which are also connected to an edge of the page 14, if the size of the page changes. The connect function of the page layout system 1 of the invention is another subroutine of the program executed by the personal computer 2 shown in FIG. 1 and can be used to define a complete dynamic page layout, as will now be described.

FIG. 13 shows one object 84 on the page 14. Initially, the size of the object 84 can be arbitrary, that is, the size of the object 84 is not constrained by or have any relationship to the size of the page 14.

In accordance with the invention, the layout system 1 enables the size of the object 84 to be automatically altered with a change in the size of the page 14. For example, as shown in FIG. 13, the user can connect the one edge, e.g., the right edge, of the object 84 to the corresponding edge, i.e., the right edge, of the page 14 by manipulating the mouse pointer 28 to point to the right edge of the object 84 and clicking the mouse button 6A and dragging to the right edge of page 14. As shown in FIG. 13, the result is that the right edge of the object 84 is connected by a double-headed arrow 86A having a distance bubble 88A, which is automatically created when the user clicks on the right edge of the selected object 84 and drags to the right edge of the page 14. As also shown in FIG. 13, the distance between the right edge of the first object 84 and the right edge of the page 14 established by performing the interconnection is automatically displayed in the distance bubble 88A, for example, the distance is 0.87 inch from the right edge of the object to the right edge of the page 14. Consequently, when the size (i.e., width) of the page 14 changes or the right edge of the page is moved, the distance between the right edge of the object 84 and the right edge of the page is always maintained at 0.87 inch. Therefore, when the size of the page 14 changes or the position of the right edge of the page is altered, the object 84 changes size accordingly so that the right edge of the object is always a fixed distance (i.e., 0.87 inch) from the right edge of the page.

In order to adjust the distance between one edge (i.e., the right edge) of the object 84 and the corresponding right edge of the page 14, the user can manipulate the mouse pointer 28 to point to the right edge of the object and click the mouse button 6A and drag right edge of object toward or away from the right edge of the page to change the distance (i.e., set a new distance). Thereafter, if the position of the right edge of the page 14 is changed, the new distance between the right edge of the object 84 and the right edge of the page is maintained at the new fixed distance. Alternatively, the user can manipulate the mouse pointer 28 to point to the distance bubble 88A and double click the mouse button 6A on the number area displayed by the distance bubble to cause a distance dialog box (not shown) to be displayed. The distance dialog box enables the user to select a distance item, and selection of the distance item enables the user to enter a desired distance using the numeric keys of the keyboard 8 shown in FIG. 1. Therefore, the user can position an edge (e.g., the right edge) of the object 84 at exactly one inch, for example, from the corresponding edge (i.e., the right edge) of the page 14.

The layout system 1 also enables the user to connect another edge, e.g., the bottom edge, of the object 84 to the corresponding edge, i.e., the bottom edge, of the page 14 by manipulating the mouse pointer 28 to point to the bottom edge of the object and clicking he mouse button 6A and dragging to the bottom edge of page, as shown in FIG. 13. The result is that the bottom edge of the object 84 is also connected by a double-headed arrow 6B having a distance bubble 88B, which is automatically created when the user clicks on he bottom edge of the selected object 84 and drags to the bottom edge of the page 14. As also shown in FIG. 13, the distance between the bottom edge of the object 84 and the bottom edge of the page 14 established by performing the interconnection is automatically displayed in the distance bubble 88B, for example, the distance is 4.15 inches from the bottom edge of the object to the bottom edge of the page. Consequently, when the size (i.e., height) of the page 14 changes or the bottom edge of the page is moved, the distance between the bottom edge of the object 84 and the bottom edge of the page is always maintained at 4.15 inches. Therefore, when the size of the page 14 changes or the position of the bottom edge of the page is altered, the object 84 changes size accordingly so that the bottom edge of the object is always a fixed distance (i.e., 4.15 inches) from the bottom edge of the page.

In order to adjust the distance between the other edge (e.g., the bottom edge) of the object 84 and the corresponding edge (i.e., the bottom edge) of the page 14, the user can manipulate the mouse pointer 28 to point to the bottom edge of the object and click the mouse button 6A and drag the bottom edge of the object toward or away from the bottom edge of the page to change the distance (i.e., set a new distance). Thereafter, if the position of the bottom edge of the page 14 is changed, the new distance between the bottom edge of the object 84 and the bottom edge of the page is maintained at the new fixed distance. Alternatively, the user can manipulate the mouse pointer 28 to point to the distance bubble 88B and double click the mouse button 6A on the number area displayed by the distance bubble to cause a distance dialog box (not shown) to be displayed. The distance dialog box enables the user to select a distance item, and selection of the distance item enables the user to enter a desired distance using the numeric keys of the keyboard 8 shown in FIG. 1. Therefore, the user can position the other edge (e.g., the bottom edge) of the object 84 at exactly two inches, for example, from the corresponding edge (i.e., the bottom edge) of the page 14. As shown in FIG. 13, the combined result is that the right and bottom edges of the object 84 will remain respective set distances from the corresponding right and bottom edges of the page 14 if the size of the page changes.

As shown in FIG. 14, the user can select the connect function of the layout system 1 to interconnect objects themselves, as well as connect an edge or edges of an object to the corresponding edge or edges of the page 14. Referring to FIG. 14, the connections between the right and bottom edges of the object 84 and the corresponding right and bottom edges of the page 14 shown in FIG. 13 have been removed, and the user has unselected the object 84 by manipulating the mouse pointer 28 to point to the blank region of the page and clicking the mouse button 6A. The user can then create another object 90 in a manner described earlier, and this object is selected, as shown in FIG. 14.

As previously described in connection with FIG. 13, the user can connect one edge (e.g., the bottom edge) of the object 90 to the corresponding edge (i.e., the bottom edge) of the page 14. The result is that the bottom edge of the object 90 is connected by a double-headed arrow 86C having a distance bubble 88C, which is automatically created when the user clicks on the bottom edge of the selected object 90 and drags to the bottom edge of the page 14. As also shown in FIG. 14, the distance between the bottom edge of the object 90 and the bottom edge of the page 14 established by performing the interconnection is automatically displayed in the distance bubble 88C, for example, the distance is 1.15 inches from the bottom edge of the object 90 to the bottom edge of the page.

As shown in FIG. 14, the user can also connect one edge, e.g., the top edge, of the object 90 to the opposite edge, i.e., the bottom edge, of the object 84 by manipulating the mouse pointer 28 to point to the top edge of the object 90 and clicking the mouse button 6A and dragging to the bottom edge of the object 84. As shown in FIG. 14, the result is that the top edge of the object 90 is connected by a double-headed arrow 86D having a distance bubble 88D, which is automatically created when the user clicks on the top edge of the selected object 90 and drags to the bottom edge of the object 84. As also shown in FIG. 14, the distance between the top edge of the object 90 and the bottom edge of the object 84 established by performing the interconnection is automatically displayed in the distance bubble 88D, for example, the distance is 1.23 inches from the top edge of the object 90 to the bottom edge of the object 84. Consequently, when the size (i.e., height) of the page 14 changes, the distance between the bottom edge of the object 90 and the bottom edge of the page 14 is always maintained at 1.15 inches, and the vertical distance between the objects 84 and 90 (i.e., the distance between the bottom edge of the object 84 and the top edge of the object 90) is always maintained at 1.23 inches. Therefore, when the height of the page 14 changes or the position of the bottom edge of the page is altered, the selected object 90 changes size accordingly (i.e., absorbs any change in height) so that the bottom edge of the object 90 is always a fixed distance (i.e., 1.15 inches) from the bottom edge of the page, and the vertical separation between the objects 84 and 90 (i.e., the distance between the bottom edge of the object 84 and the top edge of the object 90) is always a fixed distance (i.e., 1.23 inches).

Referring to FIGS. 9 and 10, the "Show Relations" item can be selected by the user to provide the relations box 78, that is, the objects 46, 52, and 54 appear in the gray relations box. The connect function of the layout system 1 allows the user to then connect the edges of the relations box 78 to any edge or edges (left, right, top, or bottom) of the page 14. That is, there is an enclosing relation object that is connected to the edges of the page 14. This enables the user to change the distance between the relation object represented by the relations box 78 and the enclosed objects and the edges of the page 14 to fill a larger portion of the page. Consequently, the entire set of relationships among the objects 46, 52, and 54 is maintained if the page size changes. For example, the first object 46, second object 52, and third object 54 can be connected so that they are separated by a fixed distance. The user can then select "Show Relations" to provide the relations box 78 and connect to the edges of the relations box to the left and right edges of the page 14. In this case, the objects grow or shrink as the size of the page 14 changes, since the distance between the objects is fixed. This allows columns of text that grow and shrink as the page 14 grows and shrinks.

Referring again to FIG. 14, as earlier described, any change in the height of the page 14 is absorbed by the selected object 90. That is, the height of the object 90 increases or grows as the height of the page 14 increases, and the height of the object 90 decreases or shrinks as the height of the page decreases. However, the user can specify that a selected object has a fixed height by manipulating the mouse pointer 28 to point to the an edge (e.g., the top edge) of the selected object (e.g., the object 90) and clicking the mouse button 6A on the edge and dragging across the interior of the selected object to the opposite edge (i.e., the bottom edge) of the object to establish an internal distance or height. As shown in FIG. 14A, the result is that the top edge of the object 90 is connected by a double-headed arrow 86E having a distance bubble 88E, which is automatically created when the user clicks on the top edge of the selected object 90 and drags to the bottom edge of the object 90. As shown in FIG. 14A, the distance between the top edge of the object 90 and the bottom edge of the object 90 established by performing the interconnection is automatically displayed in the distance bubble 88E, for example, the distance is 1.75 inches from the top edge of the object 90 to the bottom edge of the object 90. Consequently, when the size (i.e., height) of the page 14 changes, the distance between the bottom edge of the object 90 and the bottom edge of the page 14 is always maintained at 1.15 inches, the vertical distance between the objects 84 and 90 (i.e., the distance between the bottom edge of the object 84 and the top edge of the object 90) is always maintained at 1.23 inches, and the height of the object 90 remains 1.75 inches. Therefore, when the height of the page 14 changes or the position of the bottom edge of the page is altered, the object 84 changes size accordingly (i.e., absorbs any change in height) so that the bottom edge of the object 90 is always a fixed distance (i.e., 1.15 inches) from the bottom edge of the page, and the vertical separation between the objects 84 and 90 (i.e., the distance between the bottom edge of the object 84 and the top edge of the object 90) is always a fixed distance (i.e., 1.23 inches), while the height of the object 90 remains 1.75 inches.

At this juncture, the connect function of the layout system 1 previously described in connection with FIGS. 12 and 13 is based on indicating or specifying distances in absolute measurement terms, i.e., inches. Although distances can be measured in absolute terms, the connect function also enables the page layout system 1 to indicate distances or the user to specify distances in terms of percentages. That is, measurements of, and separations between objects, indicated by the layout system 1 or specified by the user are proportional to the dimensions of the page 14, as shown in FIG. 15. In order to select the percentage proportionality function of the layout system 1, the user manipulates the mouse pointer 28 to point to a percent (%) icon 92 included in the palette 34 and clicks the mouse button 6A on the percent icon. Consequently, the distance between the bottom edge of the object 90 and the bottom edge of the page 14 is always maintained at 17.29% of the height of the page 14, and the vertical distance between the objects 84 and 90 (i.e., the distance between the bottom edge of the object 84 and the top edge of the object 90) is always maintained at 18.54% of the page height.

As shown in FIG. 15, the user can additionally connect the one more edges, e.g., the left and right edges, of the object 84 to the corresponding edges, i.e., the left and right edges, of the page 14 by manipulating the mouse pointer 28 to point to the right edge (left edge) of the object 84 and clicking the mouse button 6A and dragging to the right edge (left edge) of the page. As shown in FIG. 15, the results are that the right edge of the object 84 is connected by a double-headed arrow 86F having a percentage distance bubble 88F, which is automatically created when the user clicks on the right edge of the selected object 84 and drags to the right edge of the page 14, and the left edge of the object 84 is connected by a double-headed arrow 86G having a percentage distance bubble 88G, which is automatically created when the user clicks on the left edge of the selected object 84 and drags to the left edge of the page. As also shown in FIG. 15, the distance between the right edge (left edge) of the object 84 and the right edge (left edge) of the page 14 established by performing the interconnections are automatically displayed in the distance bubble 88F (distance bubble 88G), for example, the percentage distance is 9.84% of the width of the page from the right edge of the object 84 to the right edge of the page, and the percentage distance is 8.43% of the width of the page from the left edge of the object 84 to the left edge of the page. Consequently, when the size (i.e., width) of the page 14 changes or the right edge of the page is moved, the distances between the right and left edges of the object 84 and the respective right and left edges of the page are always maintained at 9.84% and 8.43%, respectively. Therefore, when the width of the page 14 changes or the position of the right edge of the page is altered, the object 84 changes width accordingly so that the right and left edges of the object are always a fixed distance (i.e., 9.84% and 8.43% of the page width, respectively) from the respective right and left edges of the page to absorb any change in the page width. Both of the objects 84 and 90 proportionally absorb any change in the page height when the height of the page 14 changes or the position of the bottom edge of the page is altered, so that the bottom edge of the object 90 is always a proportional distance (i.e., 17.29% of the new page height) from the bottom edge of the page, and the vertical separation between the objects 84 and 90 (i.e., the distance between the bottom edge of the object 84 and the top edge of the object 90) is always a proportional distance (i.e., 18.54% of the new page height).

Selection of percentage proportionality within the connect function of the layout system 1 enables the user to click and drag to provide a double-headed arrow to set percentage distances to truly scale on a percentage basis with respect to the size of the page 14, as the size (width and/or height) of the page is changed. Consequently, the size of the object or objects (i.e., the objects 84 and 90) grows and shrinks as the size of the page 14 grows or shrinks. Therefore, when the size of the page 14 changes, the objects 84 and 90 truly scale with respect to the page.

In order to revert to absolute measurement distance, the user can manipulate the mouse pointer 28 to point to the pound sign (#) icon 94 included in the palette 34 and click the mouse button 6A to select the pound sign icon. When the pound sign icon 94 is selected, the layout system 1 subsequently displays distances in absolute measurement terms, such as inches.

The connect function of the layout system 1 of the invention can be used to define a complete dynamic page layout. The connect function also provides automatic re-sizing of objects so that the layout is automatically adaptable to available display screen sizes and resolutions. The connect function is basically all that is required to create a dynamic layout.

Considered in more detail, the connect function of the layout system 1 enables the user to interconnect objects so that the objects automatically re-size when the page size or display screen size or resolution changes. This is a very powerful method for implementing dynamic layouts that adjust themselves as the display screen size or resolution or page size changes.

Importantly, the layouts are completely dynamic. Whenever the page size or display screen size or resolution changes, the layout recalculates itself accordingly. The layouts are therefore dynamic, since the size of the objects is automatically adjusted when the display screen size or resolution or page size changes.

Significantly, the connect function of the layout system 1 provides a user interface that is intuitive (i.e., very easy to understand) and gestural. Therefore, the connect function of the layout system 1 is easy and simple to document. Also, there is no significant language content involved in the graphical user interface, so it is possible to use the interface in any language without modification, thereby minimizing localization costs.

It will be understood and appreciated that the embodiments of the present invention described above are susceptible to various modifications, changes, and adaptations. For example, although objects have been illustrated to contain only color or pattern, the layout system can comprise a graphics engine and/or text engine so text can be entered into the objects and wrap to fill the objects. Furthermore, although the layout system 1 has been described in connection with the layout of a two-dimensional page, the layout system can also be adapted to operate in three dimensions to manipulate objects in three-dimensional space. The layout system 1 provides a flexible modular layout technology that can be used for any application, including any type of content publishing, such as proprietary on-line services, Internet, multimedia, page layout, professional page layout, and windowing systems, and also desk top management as well other informational displays such as computer-based televisions, personal digital assistants, and other such monitors and devices. All is intended to be comprehended within the meaning and range of equivalents of the appended claims.

What is claimed is:

1. A layout system for drawing objects and organizing the drawn objects to facilitate creation of objects, such as boxes that can contain text, graphics, outlines, titles, headlines, animation, video, and other information and data, to provide a custom layout as well as to serve as a layout manager for organization of the objects, comprising:

a processor for executing a program;

a program executable in the processor, the program comprising subroutines for designing a graphical user interface, the subroutines for enabling objects to be created and manipulated both individually and as a group and to be arranged permanently in various relationships, in which components of the objects are interrelated;

a display screen connected to the processor for displaying the graphical user interface comprising the objects; and user input means connected to the processor and able to be manipulated by a user to interrelate objects in one or more permanent relationships by selectively distributing, aligning, sizing, or spacing components of the objects.

2. The layout system according to claim 1 wherein the subroutines comprise a distribution subroutine for equally spacing objects and there is a plurality of objects including a first object, a second object, and a third object on a page, and when one of the objects is moved, the distribution subroutine moves the other objects so that the separation among the objects across the page is equal.

3. The layout system according to claim 2 wherein the objects are one of horizontally and vertically arranged across the page, and if one of the objects is moved toward the edge of the page, the distribution subroutine moves the other objects so that the corresponding one of the horizontal and vertical separation among the three objects is equal with the separation between the first and second objects being automatically maintained equal to the separation between the second and third objects.

4. The layout system according to claim 1 wherein the subroutines comprise a distribution subroutine for equally spacing objects and the distribution subroutine enables the user to select permanent distribution so that if the user then selects and moves any object, all of the objects move in unison together as a group, and a permanent distribution relationship is maintained among the objects.

5. The layout system according to claim 1 wherein the subroutines comprise an alignment subroutine for aligning a selected component of the objects and the component of the objects to be aligned is one of the left edges, right edges, top edges, bottom edges, and centers of the objects to provide one of left edge justification, right edge justification, top edge justification, bottom edge justification, and centering of objects, respectively.

6. The layout system according to claim 5 wherein the alignment subroutine enables the user to select permanent alignment so that if the user then selects and moves any object, all of the objects move in unison together as a group, and a permanent alignment relationship is maintained among the objects.

7. The layout system according to claim 1 wherein the subroutines comprise a sizing subroutine for causing the objects to have at least one of an identical width and an identical height and the width and height can be any desired dimension.

8. The layout system according to claim 7 wherein the sizing subroutine enables the user to select permanent sizing so that if the user then selects and moves any object, all of the objects move in unison together as a group, and a permanent size relationship is maintained among the objects.

9. The layout system according to claim 1 wherein the user input means comprises a keyboard and the subroutines comprise a spacing subroutine for enabling the user to set a distance in a spacing box by means of numeric keys of the keyboard and for causing the objects to become at least one of horizontally and vertically spaced by the set distance.

10. The layout system according to claim 9 wherein the spacing subroutine enables the user to select permanent spacing so that if the user then selects and moves any object, all of the objects move in unison together as a group, and a permanent spacing relationship is maintained among the objects.

11. The layout system according to claim 1 wherein the subroutines enable the user to select show relations and create a relations box displayed around related objects to provide a graphical representation that at least one relationship exists based on user selection of distributing, aligning, sizing, or spacing the objects and wherein the user can select the relations box to move and re-size the objects in unison together as a group.

12. The layout system according to claim 1 wherein the subroutines enable the user to select a relationship query and the subroutines create a dialog box which enables the user to ascertain whether any relationship exists between a selected object and any other object and to identify any existing relationship that exists.

13. The layout system according to claim 12 wherein the dialog box provides a textual representation that any relationship exists based on user selection of distributing, aligning, sizing, or spacing the objects.

14. A layout system, comprising:

a processor for executing a program;

a program executable in the processor, the program comprising subroutines for designing a graphical user interface, the subroutines for designing dynamic page layouts that automatically adapt in size to various page sizes and display screen sizes and resolutions by enabling objects to be interrelated to a page and automatically moving the objects and causing them to grow and shrink automatically to adapt the position and size of the objects if the page is re-sized or as the size or resolution of the display screen changes;

a display screen connected to the processor for displaying the graphical user interface comprising the objects; and user input means connected to the processor and able to be manipulated by a user for interrelating objects to the page.

15. The layout system according to claim 14 wherein the subroutines enable any object to be connected to any other object and an edge of the page to provide automatic repositioning of any interconnected objects, which are also connected to the edge of the page, if the size of the page changes, whereby a dynamic page layout is defined.

16. The layout system of claim 15 wherein the subroutines set proportional distances expressed as a percentage of the page to truly scale on a percentage basis with respect to the size of the page, and as the size of the page is changed, the subroutines cause the size of the object to grows and shrink as the size of the page grows or shrinks so that, when the size of the page changes, the objects truly scale with respect to the page.

17. The layout system according to claim 14 wherein the user input means comprises a mouse and the subroutines enable the user to connect an edge of an object to the corresponding edge of the page by manipulating the mouse to point to the edge of the object and dragging to the corresponding edge of the page in a gestural manner and wherein the subroutines cause the size of the object to be automatically altered with a change in the size of the page.

18. The layout system according to claim 17 wherein the subroutines display a double-headed arrow connecting the edge of the object to the corresponding edge of the page and having a distance bubble, which is automatically created when the user drags from the edge of the object to the corresponding edge of the page, and the distance between the edge of the object and the corresponding edge of the page established by performing the interconnection is automatically displayed in the distance bubble so that when the size of the page changes or the edge of the page is moved, the distance between the edge of the object and the corresponding edge of the page is maintained at the displayed distance and the object changes size accordingly so that the edge of the object remains at the displayed distance from the corresponding edge of the page.

19. The layout system according to claim 14 wherein the user input means comprises a mouse and the subroutines enable the user to specify that a selected object has one of a fixed interior size and an proportional interior size expressed as a percentage of the page by manipulating the mouse to point to an edge of the selected object and dragging across the interior of the selected object from one edge to an opposite edge of the selected object to establish a interior size.

20. A layout system for drawing objects and organizing the drawn objects to facilitate creation of objects, such as boxes that can contain text, graphics, outlines, titles, or headlines, to provide a dynamic custom layout as well as to serve as a layout manager for organization of the objects, comprising:

a processor for executing a program;

a program executable in the processor, the program comprising subroutines for designing a graphical user interface, the subroutines for enabling objects to be created and manipulated both individually and as a group and to be arranged permanently in various relationships, in which components of the objects are interrelated, and for designing dynamic page layouts that automatically adapt in size to various page sizes and display screen sizes and resolutions by enabling objects to be interrelated to a page and automatically moving the objects and causing them to grow and shrink automatically to adapt the position and size of the objects if the page is re-sized or as the size or resolution of the display screen changes;

a display screen connected to the processor for displaying the graphical user interface comprising the objects; and user input means connected to the processor and able to be manipulated by a user to interrelate objects in one or more permanent relationships by selectively distributing, aligning, sizing, or spacing components of the objects and for interrelating objects to the page.

* * * * *